US012770408B2

(12) United States Patent
Gong et al.

(10) Patent No.: US 12,770,408 B2
(45) **Date of Patent: *Oct. 20, 2026**

(54) PROBABILISTIC MODULAR LANE TRANSITION STATE ESTIMATION

(71) Applicant: TOYOTA RESEARCH INSTITUTE, INC., Los Altos, CA (US)

(72) Inventors: Peiyan Gong, Ann Arbor, MI (US); Michael J. Delp, Ann Arbor, MI (US); Christian Potthast, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/753,361

(22) Filed: Jun. 25, 2024

(65) Prior Publication Data

US 2024/0355128 A1 Oct. 24, 2024

Related U.S. Application Data

(63) Continuation of application No. 17/525,689, filed on Nov. 12, 2021, now Pat. No. 12,056,937.

(51) Int. Cl.

| | |
|---|---|
| ***G06V 20/58*** | (2022.01) |
| ***B60W 40/04*** | (2006.01) |
| ***G06F 18/22*** | (2023.01) |
| ***G06T 7/10*** | (2017.01) |
| ***G06T 7/90*** | (2017.01) |
| ***G06T 17/05*** | (2011.01) |

(52) U.S. Cl.

CPC ........... *G06V 20/584* (2022.01); *B60W 40/04* (2013.01); *G06F 18/22* (2023.01); *G06T 7/10* (2017.01); *G06T 7/90* (2017.01); *G06T 17/05* (2013.01); *B60W 2555/60* (2020.02); *G06T 2207/10024* (2013.01); *G06T 2207/30252* (2013.01)

(58) Field of Classification Search

CPC ........... G06V 20/584; G06T 7/10; G06T 7/90; G06T 17/05; G06T 2207/10024; G06T 2207/30252; G06F 18/22; B60W 40/04; B60W 2555/60

See application file for complete search history.

(56) References Cited

U.S. PATENT DOCUMENTS

2020/0183386 A1* 6/2020 Creusot .................. G06V 20/56

* cited by examiner

*Primary Examiner* — Michael D Lang
(74) *Attorney, Agent, or Firm* — SHEPPARD, MULLIN, RICHTER & HAMPTON LLP; Daniel N. Yannuzzi

(57) ABSTRACT

A system and method are provided for making a probabilistic determination of the state of a lane transition which may be controlled by a traffic signal, such as a traffic cue. A determination of the state of transition of a traffic signal may be used by a vehicle to determine a course of action to take. In making the determination, the states of multiple traffic signals may be combined into one collection of elements that has values associated with the likelihood of the traffic signals being in a given state. Optionally, a determination may be made of whether a traffic signal is occluded.

20 Claims, 11 Drawing Sheets

PROBABILISTIC MODULAR LANE TRANSITION STATE ESTIMATION

CROSS-REFERENCE TO RELATED APPLICATIONS

This application is a continuation of and claims the benefit of U.S. patent application Ser. No. 17/525,689 filed on Nov. 12, 2021, which is hereby incorporated herein by reference in its entirety for all purposes.

TECHNICAL FIELD

The present disclosure relates generally to autonomous vehicles, and in particular, some implementations may relate to interpreting sensor information.

DESCRIPTION OF RELATED ART

Autonomous vehicles need to decide when to change lanes, when the vehicle needs to stop, and when it is safe for the vehicle to move. Sensor information received by the vehicle may be less than perfect, and the vehicle may still need to make a decision based on the information received.

BRIEF SUMMARY OF THE DISCLOSURE

According to various embodiments of the disclosed technology a system comprises: a processor system having one or more processors; and a memory system that stores one or more machine instructions, which when implemented cause the processor system to implement a method comprising: detecting a plurality of traffic signals; and determining a likelihood of a state of a traffic signal based on information characterizing a distribution of observations of the plurality of traffic signals; and determining an action for a vehicle to take based on the determining of the likelihood of the state.

According to various embodiments, the system further comprises one or more of the following features. The determining of the likelihood of the state of the traffic signal being a determination of a current likelihood of a current state, the determination of the current likelihood of the current state being further based on a prior likelihood of a prior state of the traffic signal. The determining the likelihood of the state of a traffic signal comprising: associating with each of multiple traffic signals of the plurality of traffic signals with a different collection of elements, where a given element of the different collection of elements is associated with a given traffic-signal state; populating the elements of the different collection of elements with data based on observations of the multiple traffic signals; combining the different collections of elements into one collection of elements, values of individual elements of the one collection of elements are combinations of values of corresponding elements in the different collection of elements; determining a likelihood of a transition to a state based on the one collection of elements; and determining an action for a vehicle to take based on the determining of the likelihood of the transition.

According to various embodiments, the system further comprises one or more of the following features. Determining whether a particular traffic signal of the multiple traffic signals is occluded, and determining how to treat information about the particular traffic signal when the particular traffic signal is occluded, based on the particular traffic signal being occluded. The determining of whether the particular traffic signal is occluded comprising: building a three-dimensional model of a vicinity, the vicinity comprising a region of a road between the multiple traffic signals and the vehicle; and determining whether an object interrupts a straight line connecting the vehicle to the particular traffic signal.

According to various embodiments, the system further comprises one or more of the following features. The building of the three-dimensional model comprising constructing a bounding box for an object; and the determining whether the object interrupts the straight-line comprising determining whether the straight line is interrupted by the bounding box. The determining of whether the particular traffic signal is occluded comprising: retrieving information related to a location of the particular traffic signal from a map; and determining whether the particular traffic signal is detected at the location. The determining of whether the particular traffic signal is found at the location comprising: segmenting an image; and determining whether a segment of the image that is associated with an object, other than the particular traffic signal, is in the location. The determining of how to treat information about the particular traffic signal that is occluded, comprising: determining whether the particular traffic signal is fully occluded, and if the particular traffic signal is fully occluded, ignoring sensor information related to a state of the particular traffic signal. The determining of how to treat information about the particular traffic signal that is occluded, comprising: determining a likelihood that the particular traffic signal is occluded, and adjusting a value associated with the particular traffic signal, so that an observation associated with the value is given less weight than were the particular traffic signal to have less of a likelihood of being occluded than the likelihood that was determined.

According to various embodiments, the system further comprises one or more of the following features. The different collections of elements comprising an element that is associated with whether a traffic signal of the plurality of traffic signals is occluded. The different collections of elements comprising an element associated with whether a state of a traffic signal of the plurality of traffic signals is unknown. The determining of the likelihood of the state comprising: determining a transition matrix comprising values representing a probability of a transition between two states of the traffic signal; determining a likelihood of a lane transition state based on information about a prior likelihood of the state of the plurality of traffic signals and the transition matrix.

According to various embodiments, the system further comprises one or more of the following features. The distribution of observations being represented by an observation distribution matrix, the determining of the likelihood of the state comprising: determining the observation distribution matrix, the observation distribution matrix comprising values associated with a current distribution of observations; the determining of the likelihood of the state being further based on information about a likelihood of a prior state of the plurality of traffic signals. Elements of the observation distribution matrix comprising a product of a likelihood that a given color recorded by a sensor corresponds to a particular color associated with a state of the traffic signal based on a measure of a similarity of the given color recorded and the particular color associated with the state of the traffic signal, and a likelihood that the color received by the sensor corresponds to a particular state of the traffic signal based on a likelihood of color distortions. The color distortions being associated with environmental conditions. The determining of the action for a vehicle to take comprising determining whether to wait for the plurality of traffic signals to have a state that grants permission to enter the intersection.

According to various embodiments of the disclosed technology a system comprises: a processor system having one or more processors; and a memory system that stores one or more machine instructions, which when implemented cause the processor system to implement a method comprising: determining a plurality of traffic signals at an intersection; determining whether a traffic signal of the plurality of traffic signals is occluded; determining elements of a vector that represent a likelihood of an observation of a state of the plurality of traffic signals, based on sensor information associated with the plurality of traffic signals and based on the determining of whether the traffic signal of the plurality of traffic signals is occluded; determining a likelihood of a transition to a state of the plurality of traffic signals based on the vector; and determining an action for a vehicle to take based on the determining of the likelihood of the transition.

According to various embodiments, the system further comprises one or more of the following features. The determining whether a traffic signal of the plurality of traffic signals is occluded comprising: building a three-dimensional model of a vicinity, the vicinity comprising a region of a road between the multiple traffic signals and the vehicle; and determining whether any objects interrupt a straight line connecting the vehicle to the traffic signal. The plurality of traffic signals comprises a traffic cue that is not a pre-established traffic signal.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
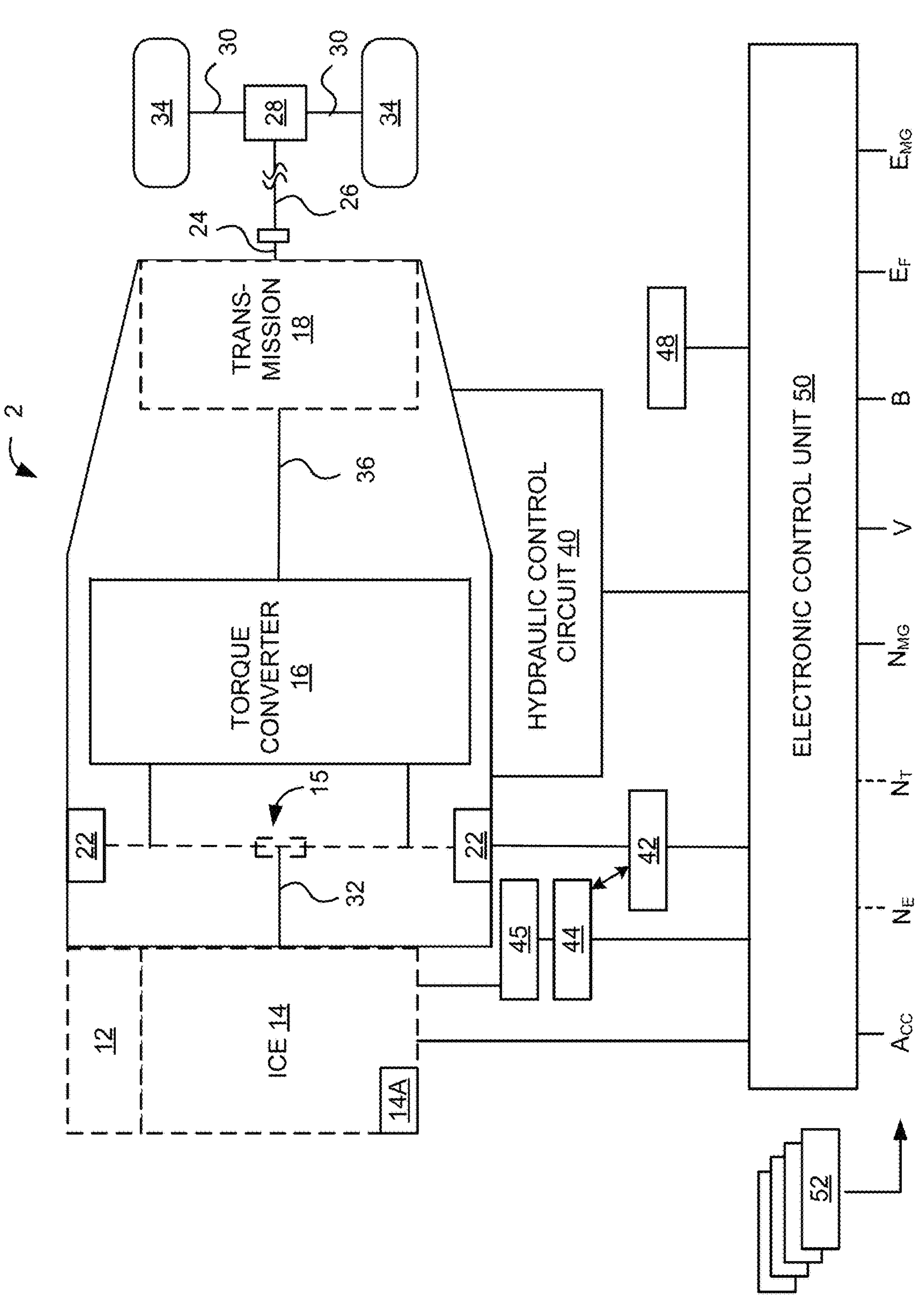
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide estimates of the transition state (or states) of a traffic signal at an intersection, based on detecting states of multiple traffic signals. As used in this specification, the term "transition" or "transitions state" may refer to a transition from a given state to a different state, or to the same given state (meaning that the state did not change yet). The term "traffic signal" is to be understood as including "traffic cues." The methods and systems used herein may be applied to any combination of different types of traffic cues, pre-established traffic signals, and other traffic signals. The term "pre-established traffic signals" refers to traffic signals that are intentionally placed at a location with the intent of being used as traffic signals, whereas traffic cues includes cues that are indicative of the state of one or one more pre-established traffic signals, but were not placed where they are for that purpose. Pre-established traffic signals include traffic lights and walk/don't walk lights, for example. Whereas, traffic cues include the movement of other vehicles and the movement of pedestrians as well as other cues that indicate a change in the state of a preestablished traffic signal. For example, if all the vehicles in a lane begin to move forward, it may be an indication that a traffic light changed from red to green. The system may account for the possibility that a traffic signal may be partially or fully occluded. In various embodiments, the state of transition can be estimated using a probabilistic model, such as a Hidden Markov Model (HMM). In various embodiments, the current states of transition between states may be estimated from a state of transition of a previous time frame and current observation. The previous time frame may be a previous time at which traffic signal data was collected or an observation was performed. The current observation may account for a determination that the traffic signal may be occluded. The current observation may include several traffic signals. Although this specification often discusses the example of representing a traffic signal as a vector, as an example, each traffic signal may be represented as a tuple, collection of variables, or another collection of elements. The current observation may be a "fusion" (or other combination) of observation vectors of several traffic signals.

Another type of the transition that is relevant to this specification is the connection between entering lane to exiting the lane at an intersection. This second transition can often be characterized as the current state of the traffic signal, such as Red, Yellow, Green, Go, or NoGo. This second transition will be referred to as the "lane transition" or the "lane transition state." When the lane transition is controlled by a traffic light, the lane transition state may have a one-to-one correspondence with the state the traffic signal controlling the lane transition. However, some lane transition states may not have a pre-established traffic signal controlling the transition. For example, in a jurisdiction where making a right turn on a red light is legal, there may not be any pre-established traffic signal that controls the right turn, lane transition, and the states traffic signals control other lane transitions may be used as an indication as to whether it is safe to make the lane transition.

Each observation vector may be correlated with a time or a series of times of the observed state(s) of one or more traffic signals. The observation vectors may be identified in-part by the location of their corresponding traffic signals.

Note that in the current system (1) the current observation can account for a determination that the traffic signal is occluded, (2) the current observation can include several traffic signals, and (3) the current observation can be a combination of observation vectors of several traffic signals. Also, a current observation of a traffic signal can be a combination of several vectors.

When an autonomous vehicle enters an intersection, the autonomous vehicle may need to determine the lane transition states to plan the autonomous vehicle's actions or to plan the trajectory that the autonomous vehicle will follow. Given a High Definition (HD) map, detection of traffic signals and of the states of traffic signals may be performed by running a computer vision algorithm, based on one or more images, which may be captured via one or more cameras or image sensors (and optionally based on other information). The autonomous vehicle may detect which traffic signals are relevant to the autonomous vehicle and determine the decisions that the autonomous vehicle needs to make, based on the state of the relevant traffic signals. The autonomous vehicle may determine, by itself, the current lane transition state, whether or not the transition state is controlled by the traffic signal state (such as Red, Yellow, Green, unknown, Go, NoGo, etc.). In other words, the vehicle may not need to download information from a server or communicate with other vehicles to determine the lane transition state controlled by the traffic signal. The unknown state may be a state where the vehicle is not able to determine the state of the traffic signal. The unknown state may result from detection of an image of something that is identified as a traffic light, but the state of the light could not be determined from the image. For example, perhaps, in the image, all the lights of the traffic signal appear to be lit or none of the lights of the traffic signal appear to be lit.

The added storage for maintaining traffic light information in HD maps is relatively low. The maintenance required to keep the traffic light information is relatively low, because the traffic light information does not change that often. A traffic light can usually be characterized by one point having three coordinates, and an indication of the type of traffic signal present. Consequently, maintaining the characterization of a traffic signal is relatively light weight and does not require a lot of memory. Nonetheless, traffic signal detection may be at times noisy and error prone. The accuracy in the determination of the states of traffic signals and the course of action to take may also depend on determining whether a traffic signal is occluded, the weather, the lighting conditions, or other conditions. The accuracy in the determination of the states of traffic signals may depend on conditions that may make identifying the state of the traffic signals that is observed more difficult. The lighting conditions may vary with time of day, weather, the mix of objects surrounding the road or vehicle, or other environmental conditions.

To facilitate determining the state of a light, in an embodiment, an algorithm may use (1) image segmentation and optional lidar (laser light detection and ranging or laser-radar) to detect traffic signal occlusion or (2) a combination of detection results from multiple traffic signals. Also, the probabilistic model may be used to estimate the lane transition state. Similarly, the probabilistic model may receive a vector that stores information characterizing a distribution of observations instead of just one discrete state.

Combining Vectors

The traffic signals at an intersection may include some traffic signals that are intended for the current lane of the vehicle. Some of the traffic signals may be intended for other lanes or for pedestrians. Although the states of the traffic signals for other lanes or for pedestrians have different states than the traffic signals intended for the current lane of the vehicle, a correlation is expected to exist between the state of the other traffic signals and the traffic signal of the current lane.

As an example of how different traffic signals may be correlated, when a crosswalk signal for crossing the current lane of the vehicle has a state of "walk," the traffic signal of the current lane of the vehicle should be red or "stop." Similarly, continuing the example, when the crosswalk signal for crossing the current lane has a state of "don't walk," the traffic signal of the current lane has a likelihood of still being red, a likelihood of being yellow, and a likelihood of being green. However, the likelihood of traffic signal of the current lane being green may be higher than the likelihood of the traffic signal of the current lane being red when the crosswalk signal is in the state of "don't' walk."

To combine the different vectors of different types, the correlation between the different types of vectors may be assumed, and a vector of one type may be converted to a vector of another, based on the correlation. For example, if a walk signal is in the "walk" state, the walk signal may be represented as red traffic signal with a value of 100% for red, and a value of 0% for green and a value of 0% for yellow (assuming that the walk sign is only displayed when the traffic signal is red). Continuing the example, a walk signal in the "don't walk" state may be represented as a traffic signal having a value of 0% for red, 20% for yellow and a value of 80% for green (assuming that the traffic signal has a 20% chance of being yellow, a 0% chance of being red, and a 80% chance of being green when the walk signal is in the "don't walk" state).

The determination of a state of a traffic light is established by a voting system that is based on all observations. For example, the different vectors for the traffic signals at the intersection may be averaged, weight averaged, or combined in another way. For example, if there are two traffic signals for the same direction of travel that are expected to contain redundant information and each is equally detectable, the vectors of those two traffic signals may be averaged. However, if the image of the one traffic signal is better or expected to be more reliable than the image of the other traffic signal, then the vectors of the different traffic signals may be weight averaged to give a higher weight to the more reliable image. In various embodiments, a distance between a traffic signal and a detector may be used as an indicator of the reliability of the observation of the state of the traffic signal. Accordingly, the weights of vectors of traffic signals that are closer to the detector may be higher than vectors of traffics signals further from the detector. Other measures of reliability or other factors may be used to determine the weights to assign to different vectors.

Image Segmentation

Image segmentation may include partitioning an image into multiple segments. Each segment may include a set of pixels or a region of an image (which may be referred to as image objects). Image segmentation may simplify or change the representation of an image. The image segmentation representation of the image may be more meaningful or easier to analyze than the entire image or than random portions of the image without the image segmentation. Image segmentation may be used to locate traffic signals or other objects, which may optionally be facilitated by locating boundaries in images.

In various embodiments, during the image segmentation a label may be assigned to every pixel in an image that represents an intersection or other region, such that pixels with the same label share certain characteristics (such as color, brightness or texture). In various embodiments, as a result of the image segmentation, a set of segments may be identified that collectively cover the entire image. Alternatively or additionally, a set of contours may be extracted from the image. The segments or boundaries may be helpful in identifying traffic signals. Each of the pixels or other elements of a region that are similar with respect to some characteristic or computed property (such as color, intensity, or texture) may be grouped together and identified as part of the same object. Adjacent regions of other segments may be significantly different with respect to the same characteristic(s) of the current segment. When applied to a collection of images, the resulting objects, or contours, determined by image segmentation, can be used to create the three-dimensional virtual model of the intersection (or other segmentation of a road or region). The collection of images may be captured by lidar or other optical techniques, for example. Image segmentation may facilitate the detection of traffic signal occlusion (optionally based on lidar).

Occlusion Detection in General

One problem for traffic signal detection is spurious or false detections of obstacles and traffic signals. Traffic signals may be detected within a patch of an image. A three-dimensional model of the image or the patch of the image may be constructed, based on a high definition map of the region in the vicinity of the vehicle and the intersection. The image patch where a traffic signal is expected to be located is often adequate for detecting the state of the traffic signal. However, sometimes there may be an object such as a tall truck, overpass, or pole between the traffic signal camera and the traffic signal of interest occluding the traffic signal. The occlusion may cause the detector to confuse, for instance, a red taillight with a red traffic signal, or part of a green reflective sign with a green turn arrow. By detecting the presence of an occlusion, the autonomous vehicle can determine whether a patch of an image is a traffic signal, another light, or some other object that has similar characteristics to a traffic signal.

Another reason for detecting occlusions is that one traffic signal may include multiple lights that provide information. Some lights may provide different information that is relevant to different lanes. For example, there could be one traffic signal that has a left turn arrow AND a red light. The red light may control the thru traffic AND the left turn traffic. So, there could be an instance where the red light is on, and thereby indicates that thru traffic should stop AND the left green arrow is on, to thereby permit left turns. Then it is important for traffic traveling on the left lane to be aware that it is permissible to turn. However, it might be possible that the green arrow is occluded for some reason by a large truck, pole, or overpass. If the green arrow is occluded, the traffic signal detector would return red and the Advanced Driver Assistance System (ADAS system) may incorrectly determine that traffic in the left lane should stop, which may cause problems, such as the autonomous vehicle blocking traffic or being involved in an accident.

Accordingly, the system may be configured to determine that the traffic signal is occluded, and the system could then reason that the signal is unknown. If the traffic signal has been determined to be occluded, the autonomous vehicle may use cues other than the traffic signals to determine whether or not to enter or traverse the intersection. For example, if the traffic signal is occluded, the system may determine whether or not to enter the intersection based on whether or not the vehicles in front of the autonomous vehicle are moving.

Traffic signal estimation may be facilitated by a camera (or other optical sensors to determine the color of the light or state of the traffic signal). Optical sensors, such as cameras facilitate the detection and recognition of the presence of a traffic signal and the current state of the traffic signal. However, using only a camera and analysis of the image to detect the current state of the traffic signal, may lead, in many cases, to an erroneous state estimations due to various kinds of other factors such as sensor noise, detection errors, classification errors, as well as environmental factors (e.g. Sun glare, other traffic participants, or occlusion). In an embodiment, the system allows for modular input. The number of input modules may depend on the sensors available. The more available sensors, the more input modules may be included in the probabilistic model. A temporal probabilistic model (e.g., a Hidden Markov Model) may facilitate the combination of various probabilistic input signals. The outcome is a more consistent and a more accurate estimate of the state of the traffic signal compared to treating each traffic signal as its own entity.

Some Optional Features

Optionally, detailed traffic signal information may be collected that is particular to an intersection, via various sources, and that information may be applied while the vehicle is at that intersection, to improve the model. For example, the information may include how long the traffic signal of that particular intersection remains in a particular state. Based on the detailed information about the intersection, a transition matrix and an initial state may be used in the probabilistic model to improve the model results. The initial-state vector may represent the initial state of the traffic signals when the initial state is unknown or when it is desired to assume that the initial state is unknown. The information may be collected by different vehicles that frequent the same intersection. The vehicle may collect and store data about intersections that the vehicle frequents more than a threshold number of times during a given time period. Information about particular intersections may be stored in a server and downloaded to a vehicle when needed.

In various embodiments, the model is still accurate and computes quickly without detailed information about the behavior of the traffic signals of particular intersections. It is advantageous to have embodiments that do not require the detailed information about the behavior of the traffic signals of particular intersections, because that information may not be available or may not be available quickly enough for use at that particular intersection. Furthermore, the modular system can be expanded or "slimmed down" depending on the vehicle's sensor suite. In other words, if the sensor suite is more elaborate, more observations may be added to the model and if the sensor suite is less elaborate, less observations may be used to build and update the model, and the model still produces accurate results. The different number of observations may be accommodated by having a corresponding number of vectors, with different vectors representing different traffic signals. Optionally, the more sensors, the more observations and traffic signals may be included in the model. The current system allows the inclusion of an arbitrary number of traffic signals that may control the lane transition state.

Input signals for a given lane transition state may take into account (1) multiple traffic signals (2) the location of the traffic signals, (3) Sun glare, or other factors. Regarding the use of multiple traffic signals, oftentimes, not just one, but a few traffic signals may control a given lane transition state.

Map Data

Regarding the use of the location of the traffic signals, the locations of traffic signals on a map may be stored so as to facilitate determining if a traffic signal is currently occluded. For example, locations of traffic signals that are map based have the possibility of being misclassified. With an occlusion reasoning system (which may be camera-based or lidar based, for example), erroneous classifications of the state of the traffic signal by the system may be discounted.

Sun Glare

Sun glare may alter the color of a traffic signal bulb, resulting in misclassification (e.g., yellow and red may be confused with one another). In various embodiments, the system may incorporate the information about the Sun's location to determine whether to discount or give a lower weight to an observation, based on a likelihood of the observation the state of a traffic signal being misclassified.

Three-Dimensional Traffic Signal Occlusion Detection

Different classes of obstacles may be determined. Three dimensional obstacles may be detected using image segmentation, point clouds, or three-dimensional bounding boxes (e.g., based on lidar detection). The detection of the three-dimensional obstacles may be facilitated by estimating obstacle classes, via deep learning. In the deep learning system, the data may undergo multiple layers of transformation as part of the learning. The point cloud may be a collection of points in space that represent an object. In other words, bounding box or point cloud may be fit to a region of an image associated with an obstacle, and then different classes of obstacles, point clouds, or boundary boxes of obstacles may be tested to determine which best matches the image of the obstacle, boundary box, or point cloud. Then a three-dimensional map may be compared to the image of the obstacle. The classification of the obstacle may facilitate identifying the locations occupied by the obstacle (the obstacles may be other vehicles or other objects).

The three-dimensional map may be built offline using previous drive logs from the same area or online from monocular cameras, stereo cameras, or lidar points. To determine traffic signal occlusion, a line may be projected or computed from the traffic signal camera to the center of the location of the traffic light in a three-dimensional model. The system may then check for an intersection between the bounding boxes and the line within the three-dimensional model of the intersection (or other location). A static or a dynamic model of the intersection may be used when computing whether or not the line intersects an object. Additionally or alternatively, partial or full occlusion of a traffic signal may be determined by determining that the traffic signal is missing an expected component (e.g., the green light portion of the traffic signal is not present). Additionally or alternatively, partial or full occlusion of a traffic signal may be determined based on an image segmentation that is based on an earlier view of the intersection, prior to the traffic signal being occluded, for example. If another object appears where the traffic signal was, the traffic signal is occluded.

Detecting Occlusion by Image Segmentation

Lidar is not the only source from which an occlusion may be derived. For example, a camera image may inform the system if the traffic signal is visible. Image segmentation may be utilized to check if a traffic signal is occluded by other moving objects. From map information, the location of traffic signals may be inferred. Localization modules may also provide an estimation of the vehicle location. Combined with camera calibration information, the expected location of a traffic signal on a camera image may be computed. For example, the distance between the lens and the image detector or the ratio of the size of image of an object to the actual size of the object, and optionally the focal length of the lens system may provide an indication of the distance to the object. The area around the location in the image where the traffic signal should be may be cropped. Using the camera image with image segmentation, the location where a traffic signal should appear may be determined.

Combining Multiple Traffic Signal Detections

The options and combinations may be limitless. For example, here are some possible, nonlimiting examples of formats of the observation vector, {Red, Yellow, Green},
{Red, Yellow, Green, Unknown},
{Red, Yellow, Green, Occluded},
{Red, Yellow, Green, Unknown, Other Traffic Directives},
{Red, Yellow, Green, Unknown, Occluded}, and
{Red, Yellow, Green, Unknown, Occluded, Other Traffic Directives}.

In various embodiments, any traffic signal that is unknown has a value of 100% for the unknown component and 0% of for all other components. In other embodiments, other values may be used for the components.

Occlusion Vector Components and Unknown Vector Components

Also, to facilitate including a component of the observation vector for occlusions, if a traffic signal is occluded, the system may discount the contribution of that vector from the combined result by a certain amount. If the traffic signal has above a threshold value of a likelihood of being completely occluded, the traffic signal is not used. If likelihood of occlusion K is computed to be that less than 100%, then the values of the other elements of the vector may be multiplied by 100%-K. For example, it there a traffic signal that has a likelihood of occlusion 80%, instead of using the vector values of {Red: 60%, Yellow: 20%, Green: 20%, Occluded: 0%},
the vector for the traffic signal will be
{Red: 12%, Yellow: 4%, Green: 4% Occluded: 80%}.

The likelihood that a traffic signal is occluded may depend on a number of factors, such as the how good of an approximation of the shape of the object was used for determining whether the object is occluded, the reliability of the determination of the shape of the object, and the reliability of the method of determining the occlusion.

Probabilistic Model Estimation

An example of a probabilistic model estimation is as follows. An observation vector is represented by $y_t$, and the lane transition state may be represented by $x_t$, where the value $x_t$ are not known and are not directly observable, and t represents t-th update to the model. The desired result is the pair $(y_t, x_t)$. In other words, given that the current observation is $y_t$, it is desired to predict the current state $x_t$. The current observation $y_t$ is the observation of the traffic signals. Knowing value of $x_t$ would determine what action the vehicle should take. For example, the lane transition state $x_t$ may be the state of trajectory through an intersection that includes entering and exiting a lane. As another example, the lane transition state $x_t$ may be the state of a trajectory through an intersection that includes making a left turn. When the lane transition state $x_t$ is green, for example, the maneuver associated with the lane transition is safe. As there is some uncertainty as to the value of $x_t$, the model computes the likelihood a $(x_t)$ given the observation $y_t$ of state $x_t$. At each timestamp, the probabilistic model estimation may take the result from the last frame $(x_{t-1})$, and an observation from the frame $(y_t)$, which are used to solve for result for this frame, represented by $x_t$. Similar to the observation vector $y_t$, the state vector $x_t$ may have countless options and combinations. Some possible formations for the state vector $x_t$ are:

{Red, Yellow, Green, Unknown},

{Red, Yellow, Green},

{Go, NoGo, Unknown}, and

{Red, Yellow, Green, Go, NoGo, Unknown}.

The probabilistic model may be used with a vector of a distribution of states instead of a discrete state. In a classic HMM discrete states only take updates from one single observation (such as Red) instead of an observation distribution vector (such as {Red: 80%, Yellow: 10%, Green: 10%}). Specifically, the forward algorithm for the probabilistic model, may compute the probability of a state based on the equation, $$\alpha_t(x_t) = p(x_t, y_{1:t}) = \sum p(x_t, x_{t-1}, y_{1:t}), \quad \text{(eq. 1)},$$

where the sum is over all $x_{t-1}$.

The index t is the time that a state occurs and $x_t$ is a value of the state (e.g., red, blue, or green) at time t. The symbol $y_t$ represents an observed value of the state (e.g., the color that the light appears in an image, which may not be quite the same as the actual state) at time t. Whereas, the symbol $y_{1:t}$ is a collection of observations at various times from 1 to t. The likelihood matrix element $p(x_t, y_{1:t})$ is the likelihood that the state is indeed $x_t$ based on the collection of observations $y_{1:t}$, and $p(x_t|x_{t-1})$ is the probability that there was a transition between state $x_t$ and $x_{t-1}$.

For example, for a three component vector that just has values for red, yellow, and green, if $x_t$=Y (yellow) at times t=1,2,3,4, and if the traffic signal was observed to be $y_1$=Red, $y_2$=Red, $y_3$=Green, $y_4$=Green, respectively, then $y_{1:t}$={Red, Red, Green, Green}. Then, $\alpha_4(Y)$ is the likelihood that the observed traffic signal is yellow at time t=4 given that the observed sequence of traffic signals $y_{1:t}$={Red, Red, Green, Green}, which is written $p(x_t$=yellow, $y_{1:t}$={Red, Red, Green, Green}). The likelihood of the state being yellow, based on the sequence of observations Red, Red, Green, Green is given by $$\begin{aligned} p(x_t = Y,\ y_{1:t} = \{\text{Red, Red, Green, Green}\}) = \\ p(x_t = Y,\ x_{t-1} = Y,\ y_{1:t} = \{\text{Red, Red, Green, Green}\}) + \\ p(x_t = Y,\ x_{t-1} = R,\ y_{1:t} = \{\text{Red, Red, Green, Green}\}) + \\ p(x_t = Y,\ x_{t-1} = G,\ y_{1:t} = \{\text{Red, Red, Green, Green}\}). \end{aligned}$$

In the above expression, $p(x_t$=Y, $x_{t-1}$=Y, $y_{1:t}$={Red, Red, Green, Green}) is the likelihood that the traffic signal transitioned from yellow to yellow, given that the observed sequence of traffic signals was $y_{1:t}$={Red, Red, Green, Green}. Also, $p(x_t$=Y, $x_{t-1}$=R, $y_{1:t}$={Red, Red, Green, Green}) is the likelihood that the traffic signal transitioned from red to yellow, given that the observed sequence of traffic signals was $y_{1:t}$={Red, Red, Green, Green}. Similarly, $p(x_t$=Y, $x_{t-1}$=G, $y_{1:t}$={Red, Red, Green, Green}) is the likelihood that the traffic signal transitioned from green to yellow, given that the observed sequence of traffic signals was $y_{1:t}$={Red, Red, Green, Green}.

Eq. 1 may lead to:

$$\alpha'_t(x_t)=p(y_t|x_t)\Sigma p(x_t|x_{t-1})\alpha_{t-1}(x_{t-1}), \text{ where the sum is over all } x_{t-1} \quad \text{(eq. 2)}$$

The computed likelihood $a'_t(x_t)$ is the unnormalized likelihood of the state being $x_t$, and $\alpha_t\ (x_t)$ is the normalized likelihood of the state being $x_t$. The computed likelihood $\alpha'_t(x_t)$ may be normalized by dividing each likelihood $a'_t\ (x_t)$, by the sum of all likelihoods $\alpha'_t\ (x_t)$, as follows, $$\alpha_t(x_t) = \alpha'_t(x_t) / \left(\sum \alpha'_t(x_t)\right).$$

Since the traffic signal must be in some state, it may be more convenient to compute the normalized likelihoods. In eq. 2, $p(y_t|x_t)$ are the elements of the observation distribution of the probabilistic model and $p(x_t|x_{t-1})$ are the transition probabilities of the probabilistic model. In a classical discrete probabilistic model, an observation is one single discrete state, instead of an observation distribution.

Example Computation

As an example, given a state space {R, Y, G} and observation space {Red, Yellow, Green, Unknown}, the observation distribution for a given state R becomes, $$p(Red|R), p(\text{Yellow}|R), p(\text{Green}|R), p(\text{Unknown}|R)$$

To calculate the likelihoods $\alpha'_t(x_t)$ using the equation, $a'_t(x_t)=p(y_t|x_t)\Sigma p(x'|x_{t-1})\alpha_{t-1}\ (x_{t-1})$, given that the observed state of the traffic signal is $y_t$=Red, one obtains, $$\alpha'_t(x_t) = p(\text{Red} \mid x_t) \sum p(x_t \mid x_{t-1}) \alpha_{t-1}(x_{t-1}).$$

For each possible state $x_t$, the values of observation distribution $p(\text{Red}|x_t)$, the transition matrix $p(x_t|x_{1-1})$, and the prior likelihoods $\alpha_{t-1}\ (x_{t-1})$ are known or may be assumed, and therefore one can compute the current likelihood $a'_t(x_t)$ of a given state.

Consider the case in which $y_t$ is a distribution among all observations instead of one single observation. For example, given a probabilistic model with state space {R, Y, G} and observation space {Red, Yellow, Green, Unknown}, the observation vector $y_t$ is {Red: a, Yellow: b, Green: c, Unknown: d}, where a, b, c, d may be likelihoods of an observation, instead of one single observation, such as Red, Green, or Yellow. The observation vector (a, b, c, d) is an example of a vector obtained by combining the vectors of individual traffic signals into one vector. The observation vector $y_t$ may be normalized so that the components of the observation vector sum to 100%.

However, there is a possibility, that although the image shows one color, (e.g., traffic signal yellow), the traffic signal is actually another color (e.g., red or green), depending on the environmental conditions or depending on the condition of the traffic signal. To some extent, the color distortion effects can be compensated for (e.g., by subtracting and/or adding certain colors of light to the image) based on the lighting conditions. Nonetheless even after the lighting conditions have been automatically compensated for, there still may be color distortions in the image. At times it may be difficult for image analysis logic to distinguish between what is a color distortion and what is not a color distortion, such as when the color distortion is the only indication of the lighting condition that is causing the color distortion. Consequently, the likelihood that the color in the image is the color of one of the states of the traffic signal (red, yellow, or green) may need to be multiplied by the likelihood that the color in the image is distorted (e.g., due to lighting or environmental conditions), to account for color distortions. It is possible that even though the color in the image may identically match one of the colors of the states of the traffic signal, the traffic signal may in fact be a different color. Consequently, the value of $p(y_t|x_t)$ may be computed from the formula $$p(y_t \mid x_t) = a*P(\text{Red} \mid x_t) + b*P(\text{Yellow} \mid x_t) + c*P(\text{Green} \mid x_t) + d*P(\text{Unknown} \mid x_t),$$

where the matrix $P(y_t|x_t)$ may be referred to as the likely-current-state matrix. The likely-current-state matrix $P(y_t|x_t)$ gives the likelihood that even though the traffic signal state that was observed was $y_t$, given that the actual current lane transition state is $x_t$. Thus, $P(\text{Red}|x_t)$ may be the likelihood that given the lane transition state $x_t$, the observed color is red. Similarly, $P(\text{Yellow}|x_t)$ may be the probability that, the given lane transition state is $x_t$ even had the observed color been yellow. Likewise, $P(\text{Green}|x_t)$ may be the probability that, the given lane transition state is $x_t$ even had the observed color been green, and $P(\text{Unknown}|x_t)$ is the probability that the lane transition state is $x_t$ even had the observed color been unknown. The values of $p(\text{Red}|x_t)$, $p(\text{Yellow}|x_t)$, $p(\text{Green}|x_t)$, and $p(\text{Unknown}|x_t)$, may be predetermined phenomenologically or theoretically. The values of $p(\text{Red}|x_t)$, $p(\text{Yellow}|x_t)$, $p(\text{Green}|x_t)$, and $p(\text{Unknown}|x_t)$, may be stored in a table, or computed, while the vehicle is being operated based on the specifics of the traffic signals and environmental conditions in a region of interest. The environmental condition may include the weather, time of day, the cloud cover (if any), the position of the Sun in the sky relative to the traffic signals or vehicle, the surrounding landscape, or other environmental conditions.

In this way, a, $(x_t)$ can be solved with a "discrete observation distribution." For example, if it is desired to update probabilistic model with the observation distribution, {Red: 100%, Yellow: 0%, Green: 0%, Unknown: 0%}

Then, the observation distribution is $p(y_t|x_t)=P(\text{Red}|x_t)$, which is the observation distribution of the probabilistic model. If an uncertain observation is received of {Red: 50%, Yellow: 50%, Green: 0%, Unknown: 0%}

The likelihood should be $$p(y_t \mid x_t) = P(\text{Red} \mid x_t)*50\% + P(\text{Yellow} \mid x_t)*50\%$$

For example, assume t=1. When one arrived at a light at time t−1=0, the initial probabilities may be $\alpha_0(R_0)$=45%, $\alpha_0(Y_0)$=10%, $\alpha_0(G_0)$=45%, because in the region of interest, the average light is red 45% of the time, yellow 10% of the time, and green 45% of the time.

For example, the transition matrix may be

| | $G_0$ | $Y_0$ | $R_0$ |
|---|---|---|---|
| $G_1$ | $p(G_1, G_0)$ = 92% | $p(G_1, Y_0)$ = 0% | $p(G_1, R_0)$ = 8% |
| $Y_1$ | $p(Y_1, G_0)$ = 8% | $p(Y_1, Y_0)$ = 60% | $p(Y_1, R_0)$ = 0% |
| $R_1$ | $p(R_1, G_0)$ = 0% | $p(R_1, Y_0)$ = 40% | $p(R_1, R_0)$ = 92% |

Note that the rows or columns of the transition matrix each add to 100%. Example of the Likely-Current-State Matrix

| | $\text{Green}_1$ | $\text{Yellow}_1$ | $\text{Red}_1$ |
|---|---|---|---|
| $G_1$ | 68% | 30% | 2% |
| $Y_1$ | 30% | 60% | 8% |
| $R_1$ | 2% | 10% | 90% |

Note that the columns of the likely-current-state matrix add to 100%. Since the observation distribution $p(x_t|y_t)$ is the product of the observation matrix and the likely-current-state matrix $P(x_t|y_t)$, the diagonal elements of the observation distribution $p(x_t|y_t)$ are given by $$p(y_t = \text{Red} \mid R) = a*P(\text{Red} \mid R) + b*P(\text{Yellow} \mid R) + c*P(\text{Green} \mid R) + d*P(\text{Unknown} \mid R),$$

$$p(y_t = \text{Yellow} \mid Y) = a*P(\text{Red} \mid Y) + b*P(\text{Yellow} \mid Y) + c*P(\text{Green} \mid Y) + d*P(\text{Unknown} \mid Y), \text{ and}$$

$$p(y_t = \text{Green} \mid G) = a*P(\text{Red} \mid G) + b*P(\text{Yellow} \mid G) + c*P(\text{Green} \mid G) + d*P(\text{Unknown} \mid G).$$

If {a, b, c, d}={100%, 0,0,0} (the measured color of the light is a perfect traffic-light red), then, assuming the above likely-current-state matrix (or P Matrix), the diagonal elements of the observation distribution is $$p(y_t = \text{Red} \mid R) = P(\text{Red} \mid R) = 90\%,$$

$$p(y_t = \text{Yellow} \mid R) = P(\text{Red} \mid Y) = 8\%, \text{ and}$$

$$p(y_t = \text{Green} \mid R) = P(\text{Red} \mid G) = 2\%,$$

Also, if {a, b, c, d}={100%, 0,0,0}, then the likelihood of the red observation resulting from the state $x_t$ is $$p(\text{Red} \mid x_t) = p(y_1 = \text{Red}, x_1 = \text{Red}) = 90\%, \text{ and for each } x_t \text{ becomes, } \alpha'_t(x_t) = \alpha'_1(x_1 = R) = p(y_1 = \text{Red} \mid x_1 = R)\sum_{X^0=R,Y,G,Unknown} p(x_1 = R \mid x_0)a_0(x_0) = 90\%((45\%)0\% + (10\%)(8\%) + (45\%)(92\%)) = 38\% \quad \text{eq. 2}$$

-continued $$\alpha'_t(x_t) =$$

$$\alpha'_1(x_1 = Y) = p(y_1 = \text{Red} \mid x_1 = Y)\sum_{X^0 = R,Y,G,Unknown} p(x_1 = Y \mid x_0)a_0(x_0) =$$

$$8\%((45\%) \cdot 8\% + (10\%)(2\%) + (45\%)(92\%)) = 2\%$$

$\alpha'_1(x_1=G)=1\%$. After normalization, the values of $\alpha_1$ $(x_1)$ for each state $x_1$ are $$\alpha_1(x_1 = R) = 93\%,\ \alpha_1(x_1 = Y) = 5\%,\ \alpha_1(x_1 = G) = 2\%.$$

The values a, b, c are the likelihoods that the traffic signal is green in appearance based on the color measured, which may depend on the detector. The values of a, b, c, may be based on a measure of how close the color detected is to the colors of the traffic signal.

Probabilistic Observation Vector

The discussion that follows uses the example of a three-component vector or a four-component vector but is applicable to a vector of more components. Optionally, a probabilistic value may be established for even a single observation of a single light, based on the closeness of the color of the observation to the color of the signal (or based on other criteria). In various embodiment, even for a single observation, one may compute a likelihood that the observed information is a particular state. For example, for simplicity, assume that the detector is made up of elements each having a traffic-light-red detector, traffic-light-yellow detector, and traffic-light-green detector. Where, the traffic-light-red detector, traffic-light-yellow detector, and traffic-light-green detector detect the same color of red, yellow, and green as used in the local traffic lights. Then the percentage of a given color in the image of a traffic light may be used as the likelihood of the traffic light being that color. The percentage of a given color in the image is a sum of the brightness of a given color divided by the sum of the brightness of all the colors may be the likelihood that the color detected is that given color, which may have already been computed as part of an image analysis of a camera image, for example. In the combined vector, of multiple traffic signals, the values a, b, and c may be the weighted average of the a, b, and c values of the individual traffic lights.

If the elements of the detectors detect blue, green, and red, then the colors detected by the detector may be divided into the components of color of a traffic light, to determine the percentage of each color detected. Alternatively, one may take the component blue as unknown, and assign a likelihood of being green, yellow, or red according to how much green and yellow is the in the image of the light. The components a, b, c, may be computed in many other manners based on the percentage of the different colors detected by a camera or other light sensor.

An Example of the Vehicle

The systems and methods disclosed herein may be implemented with any of a number of different vehicles and vehicle types. For example, the systems and methods disclosed herein may be used with automobiles, trucks, motorcycles, recreational vehicles, and other vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for estimating the state of a lane transition can be implemented in other types of vehicle including gasoline or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can include a radiator, a water pump, and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operates as a generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and braking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, and complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units may be implemented using two or more separate electronic control units or a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Vehicle 2 may include a Global Positioning Signal, to help determine the location of vehicle 2 on a map, camera signal, lidar signal, radar signal, other light sensors, and/or other signals for determining the location of the vehicle and the locations of other vehicles and objects in an intersection.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, the state of traffic signals, lane transition states, or obstacles occluding a traffic signal, for example. Still other sensors may include those that can detect road grade. While some sensors can be used to actively detect passive environmental objects, other sensors can be included and used to detect active objects such as those objects used to implement smart roadways that may actively transmit and/or receive data or other information.

The examples of FIG. 1 are provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
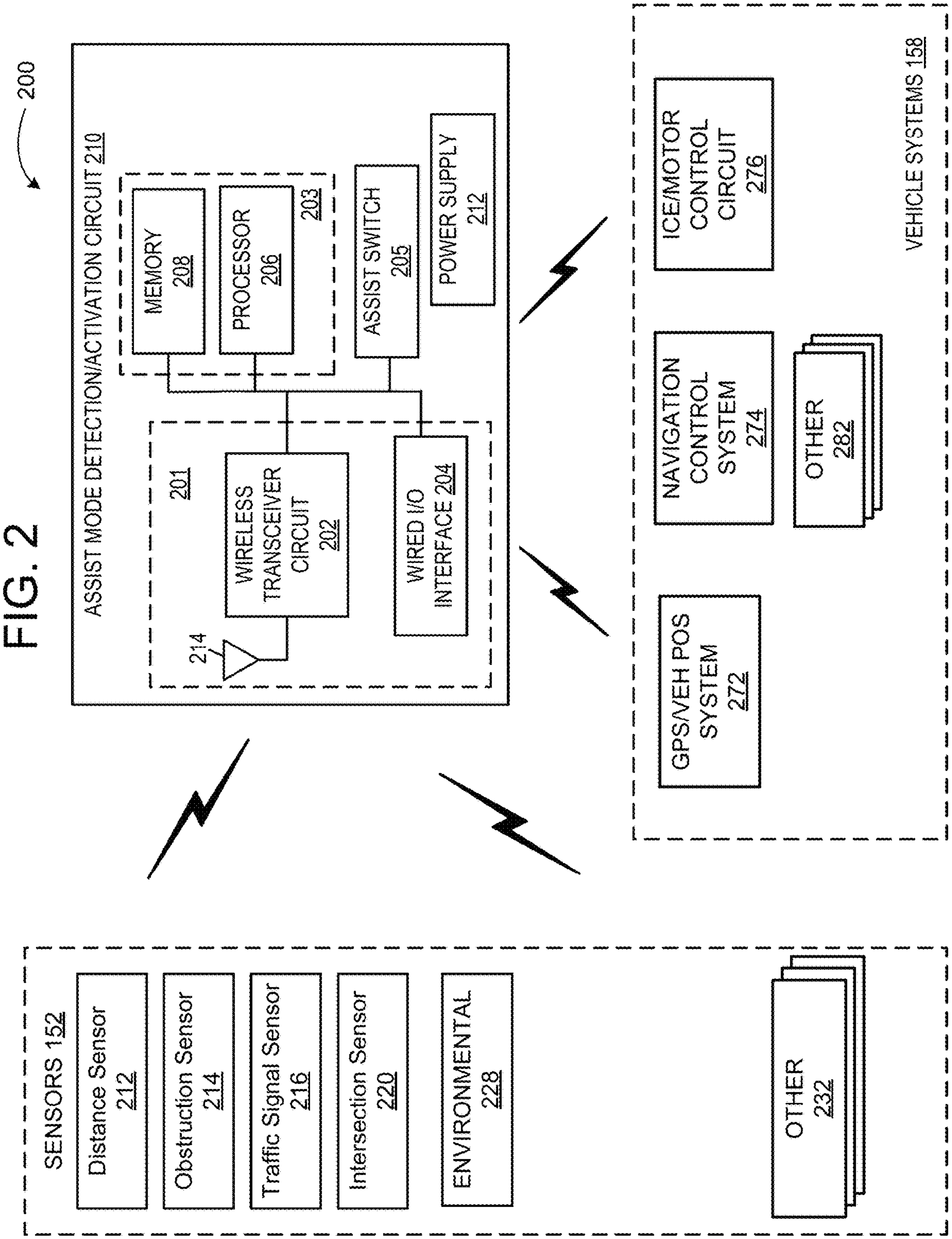
FIG. 2 illustrates an example architecture for a control system that determines actions to take based on sensor information in accordance with one embodiment of the systems and methods described herein.

FIG. 2 illustrates an example architecture for detecting transitions between states of traffic signals and for planning the trajectory of a vehicle based on the state of the traffic signal, in accordance with one embodiment of the systems and methods described herein. In an autonomous mode the vehicle may automatically navigate intersections, detect the presence of traffic cues, and determine the lane transition state, or traffic signal. Referring now to FIG. 2, in this example, system 200 includes a traffic signal detection circuit 210, which detects the presence of an upcoming traffic signal, lane transitions, and the transition state of traffic signals and cues. System 200 may be included in or may include an Advanced Driver Assistance System (ADAS system). For example, traffic signal detection circuit 210 may detect that the vehicle is approaching an intersection, traffic light, or intersection. Traffic signal detection circuit 210 may include a plurality of sensors 152, and a plurality of vehicle systems 158. Sensors 152 and vehicle systems 158 can communicate with traffic signal detection circuit 210 via a wired or wireless communication interface. Although sensors 152 and vehicle systems 158 are depicted as communicating with traffic signal detection circuit 210, they can also communicate with each other as well as with other vehicle systems. Traffic signal detection circuit 210 can be implemented as an ECU or as part of an ECU, such as electronic control unit 50. In other embodiments, traffic signal detection circuit 210 can be implemented independently of the ECU.

Traffic signal detection circuit 210 in this example includes a communication circuit 201, a decision circuit (including a processor 206 and memory 208 in this example) and a power supply 212. Components of traffic signal detection circuit 210 are illustrated as communicating with each other via a data bus, although other communication interfaces can be included. Manual switch 205 can be operated by the user to manually select whether to operate the vehicle manually, autonomously, or semi-autonomously. If an autonomous or semiautonomous mode is selected, traffic signal detection circuit 210 may be activated to detect the presence of traffic signals, the transition between states of traffic signals, the lane transition state, or automatically navigating through an intersection.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), vectors representing traffic signals, instructions and variables for processor 206 as well as any other suitable information. Memory 208 can be made up of one or more modules of one or more different types of memory. Memory 208 may be configured to store data and other information as well as operational instructions that may be used by the processor 206 to traffic signal detection circuit 210. For example, memory 208 may include an algorithm for determining the position of the vehicle 2, the positions of other objects, whether a traffic signal is occluded, an action to take based on a transition in state of a traffic signal, the probability of a transition of a state of a traffic signal, the probability of a given lane transition state.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a traffic signal detection circuit 210.

Communication circuit 201 may include either or both a wireless transceiver circuit 202 with an associated antenna 214 and a wired I/O interface 204 with an associated hardwired data port (not illustrated). As this example illustrates, communications with traffic signal detection circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by traffic signal detection circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or any other suitable power supply.

Sensors 152 can include, for example, sensors 52 such as those described above with reference to the example of FIG. 1. Sensors 52 can include additional sensors that may or not otherwise be included on a standard vehicle 10 with which system 200 is implemented. In the illustrated example, sensors 152 include vehicle distance sensor 212, obstruction sensor 214, traffic signal sensor 216, environmental sensor 228. Additional sensors 232 can also be included as may be appropriate for a given implementation of system 200. Distance sensor 212 may include a circuit that detects the distance to a traffic signal. Obstruction sensor 214 may include a circuit that detects whether a traffic signal is occluded. Intersection sensor 216 may include a circuit that detects the presence of a traffic signals. Traffic signal state sensor 218 may include a circuit for detecting the state of a traffic signal. Distance sensor 212, obstruction sensor 214, intersection sensor 216, and traffic signal state sensor 218 may also include or be connected to optical sensors, acoustical sensors, antenna, a lidar system, or a radar system, for example. The optical sensors, acoustical sensors, antenna, a lidar system, or a radar system may aid distance sensor 212, obstruction sensor 214, intersection sensor 216, and traffic signal state sensor 218 in detecting distance, obstructions, intersections, or the state of a traffic signal. Environmental sensor 230 may detect environmental conditions that affect the measurement information provided by the other sensors. For example, environmental sensor 230 may detect the position of the Sun, the presence of fog, the color of the ambient lighting, or other conditions that may affect the interpretation of information obtained from other sensors. For example, the color of traffic signals, detected by optical sensors may be affected by the presence of glare, ambient lighting, or fog.

Vehicle systems 158 can include any of a number of different vehicle components or subsystems used to control or monitor various aspects of the vehicle and its performance. In this example, the vehicle systems 158 may include a GPS or other vehicle positioning system 272, navigation control system 274, engine/motor control circuits 276 to control the operation of engine or motor. GPS or other vehicle positioning system 272 may help identify when the vehicle is at an intersection, which in combination with map information may facilitate identifying the traffic signals located at an intersection. Navigation control system 274 may be used for navigating through an intersection during an autonomous mode based on the lane transition state. Engine/motor control circuits 276 may control whether the vehicle remains stationary, waits at a traffic signal, or proceeds through an intersection based on the lane transition state or the state of the traffic signals that control traffic in the lanes of travel of vehicle 2.

During operation, traffic signal detection circuit 210 can receive information from various vehicle sensors to determine whether the traffic signal detection mode should be activated. Also, the driver may manually activate the traffic signal detection mode by operating switch 205. Communication circuit 201 can be used to transmit and receive information between traffic signal detection circuit 210 and sensors 152, and traffic signal detection circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the traffic signal detection mode. Additionally, communication circuit 201 can be used to send an activation signal or other activation information to various vehicle systems 158 as part of entering the traffic signal detection mode. The decision regarding what action to take via the various vehicle systems 158 can be made based on the information detected by sensors 152, the probabilistic model that estimates lane transitions states, and a probability of a transition between states of the traffic signal. Examples of this are described in more detail below.

Figure 3:
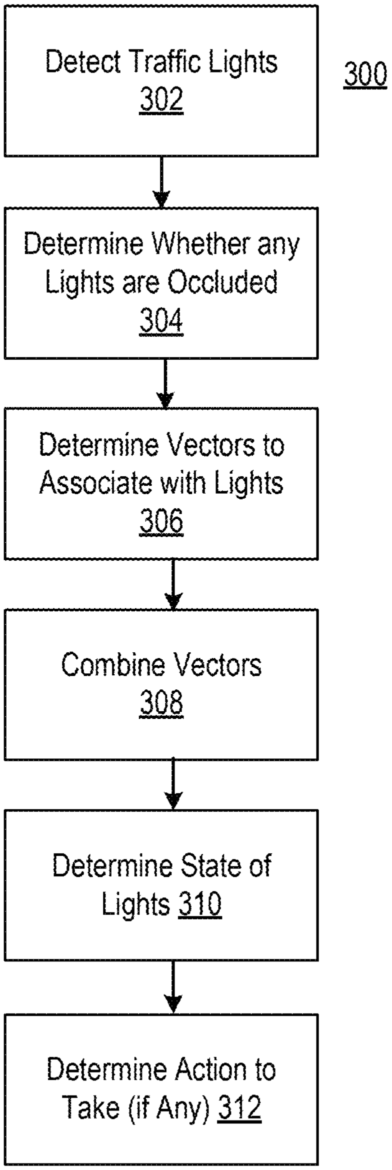
FIG. 3 illustrates a flowchart of an embodiment of a method of determining the next action to take at an intersection.

FIG. 3 illustrates a flowchart 300 of an embodiment of an example of method of determining the next action to take at an intersection.

In step 302, traffic signals are detected. Step 302 may involve vehicle 2 capturing images and analyzing the images to determine types of objects in an image and locations of the objects. As part of identifying the objects in the image, traffic signals may be identified. Step 302 may optionally involve determining that vehicle 2 is approaching an intersection, which may trigger searching the images for traffic signals, and making a determination of whether traffic signals are present. Step 302 may include retrieving information from a map, which may include the information about the presence of traffic signals, the type of traffic signals present, and so on. For example, the map might indicate that a left turn signal is present or that an RGY signal includes a turn arrow. The map may also include data about the traffic signals, which may include crowd-sourced data, such as signal behavior, and official system data, and other data. The signal behavior may include how long the signal stays at a given state, the order of transitions of one relative to other signals at that intersection, etc. Some examples of official system data include that opposing left turn lanes are always green at the same time, or the vehicle travel lanes are always green when the crosswalk is in the don't walk state. This additional data might be used to resolve conflicts or address ambiguities (e.g., such as might be caused by an occlusion), or to otherwise allow the vehicle to manage its operation. For example, the additional data may be used to auto-stop the engine if the light is known to be a long light, or restart the engine just before a red light is expected to transition to green.

In step 304, a determination is made whether any lights are occluded. Step 304 may involve comparing the information retrieved from the map about the presence of traffic signals. Step 304 may involve determining whether the map indicates the presence of traffic signals that were not detected, determining whether any of the traffic signals detected have missing features, or determining whether objects interrupt a line a sight between a vehicle sensor and a signal. For example, a turn arrow might be occluded, and an approaching vehicle might not sense the presence of a signal with a turn arrow. However, the map data may indicate the presence of the turn signal so that the vehicle can determine to look for that signal and can determine that an occlusion may have occurred if that signal is not detected. Step 304 is discussed further in FIG. 4, below.

In step 306, vectors (or other tuples of values or collections of values) are associated with each traffic signal. Optionally, vectors may be associated with traffic lane transition states. Some traffic signals may have more elements than others, and therefore may need more components. For example, a Go/NoGo type of a traffic signal vector may only have two components, whereas other traffic signals may have between 5 and 7 components. The component of the vector may include one component for each traffic differently colored light, a right turn signal, left turn signal, one component for the likelihood that part of the traffic signal is occluded, and one component for the likelihood that the state of the traffic signal is unknown.

In step 308, the vectors of the all the lights of the intersection that are detectable are combined into one vector. In various embodiments, the combined vector has as many components as the contributing vector that has the most components. There are many ways in which the vectors may be combined. For example, the vectors may be averaged on a component-by-component basis. In various embodiments, the value representing the combination of components of each vector, only includes vectors that have that component. Thus, if only two of the three lights has right turn arrow, then the two right turn arrow components are combined (e.g., averaged), but and the vector with no right turn arrow is ignored when computing the value of the component representing the right turn arrow for the combined vector. By contrast, if all three traffic signals have red, yellow, and green lights, values from all three traffic signals are combined when computing the values of the red, yellow, and green lights. In various embodiments, the vectors may be weight averaged, where the weight assigned to each vector may be based on a measure of the reliability or accuracy of the vector. For example, vectors of traffic signals that are further away may be given a lower weight than vectors of traffic signals that are closer. Similarly, vectors of lights, having images that have color distortions may be weighted lower than vectors of lights without color distortions.

In step 310, the states of the traffic signals are determined. Step 310 may involve computing the likelihood of the lights having a state based on a prior state and current observation. Step 310 is discussed further in conjunction with FIG. 5. In step 312, a determination is made as to what action to take based on the current or expected state of the signal. For example, if the traffic signal was detected to be red, and is expected to stay red, vehicle 2 may determine to continue to wait of the state of the traffic signal to change, and some or all of method 300 is repeated. There are times when the state of a single traffic signal may be of interest, in which case method 300 may be used to determine the state of that traffic signal, and the determination may be based on the states of other traffic cues associated with the same intersection as that traffic signal. Other times there may be multiple traffic signals that are supposed to have redundant information, which may or may not be a subset of the all the traffic signals of the intersection. In which case, method 300 may be used to determine the state of the group of traffic signals that are supposed to convey redundant information. There may be other times, where the state(s) of all the traffic signals of an intersection as whole may be of interest, in which case method 300 may be used to determine the state of the intersection or the state of each traffic signal of the intersection, even though some of the traffic signals are supposed to convey different information. The state of the intersection as-a-whole may be indicative of how much time it may take for a light to change or whether other vehicles are present. The state of the intersection as-a-whole may include whether pedestrians are crossing a lane of interest even though that lane may have a green arrow.

Figure 4:
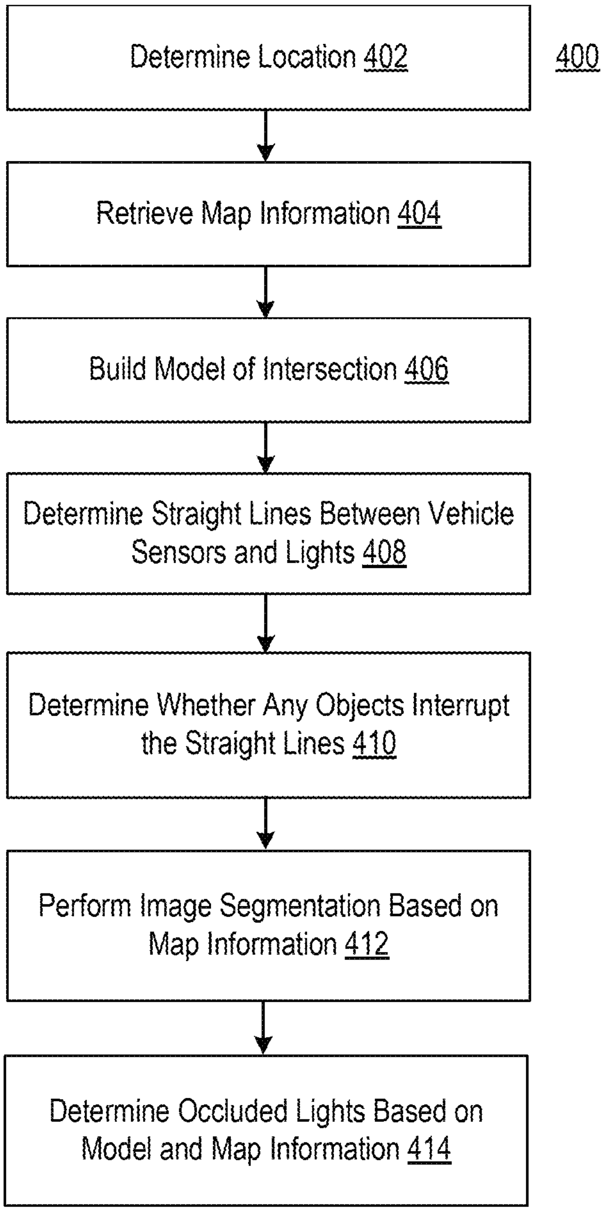
FIG. 4 illustrates a flowchart of a method of determining whether there are any occluded signals.

FIG. 4 illustrates a flowchart 400 of a method of determining whether there are any occluded lights. In step 402, the vehicle's location may be determined, to facilitate determining the portion of the map from which information is retrieved. The vehicle's location may be useful in determining the distance to lights and whether a light is occluded. The location of vehicle 2 may also be useful in determining the distance to other objects in the intersection. Step 402 may involve retrieving global positioning system (GPS) coordinates.

In step 404, map information is retrieved, which may be based on the location information retrieved in step 402.

In step 406, a virtual model is built of the intersection and the location of objects in the intersection. Step 406 may include determining the location of other vehicles in the intersection. Step 406 may involve using information from the detectors of the vehicle indicative of the location of objects. Step 406 may involve using lidar or the reflection of other electromagnetic waves to determine the locations of objects. The model may be a virtual three-dimensional model. As part of step 406, bounding boxes or point clouds may be associated with the objects in the intersection as an approximation of the space occupied by the objects. The point cloud may be represented as a collection of coordinates of points that occupy the space where an object is located. In the coordinate system of the object, the bounding box for an object may be represented as $x<x_{max}$, $y<y_{max}$, and $z<z_{max}$.

In step 408, straight lines between the sensors of vehicle 2 and the traffic signals are computed, and a determination is made whether the straight lines are interrupted by any objects in the intersection. Step 408 may include using the coordinates of the location of sensors on vehicle 2 (or other points associated with vehicle 2) and coordinates of one or more points on each traffic signal detected to compute a straight line joining the two points. For example, if the two points are $(x_0, y_0, z_0)$ and $(x_1, y_1, z_1)$, one needs two relationships between the points $(x_0, y_0, z_0)$ and $(x_1, y_1, z_1)$ to uniquely define a line in three dimensions. For example, the line may be represented by the any two of the lines $$y-y_0=m_{yx}(x-x_0),\text{ where } m_{yx}=(y_1-y_0)/(x_1-x_0);$$

$$z-z_0=m_{zy}(y-y_0),\text{ where } m_{zy}=(z_1-z_0)/(y_1-y_0);$$

$$z-z_0=m_{zx}(x-x_0),\text{ where } m_{zx}=(z_1-z_0)/(x_1-x_0);\text{ and}$$

$$z-z_0=m_\rho(\rho-\rho_0),\text{ where } \rho=sqrt(x^2+y^2),\ \rho_0=sqrt(x_0^2+y_0^2),$$

$$m_\rho=(z_1-z_0)/(\rho_1-\rho_0),\text{ and } \rho_1=sqrt(x_1^2+y_1^2).$$

The first of the above equations, may also be written as $x-x_0=m_{xy}(y-y_0)$, where $m_{xy}=(x_1-x_0)/(y_1-y_0)$. If the origin of the of the coordinate system is the sensor, then in spherical coordinates, the coordinates of the traffic signal may represent the line to the light. Lines may be represented using other coordinate systems. There are many other ways of representing the equation of the line connecting the traffic signal and a sensor of vehicle 2, which may be computed as part of step 406.

In step 410, a determination may be made as to whether one of the straight lines is intersected by one of the objects of the intersection. Step 410 may involve determining whether the lines computed in step 408 intersect one of the bounding boxes or point clouds of step 406. If no bounding box intersects the line, there is no occlusion. If one of the bounding boxes intersects the line, a further determination may be made whether the object in fact is present in the part of the bounding box that was intersected (the object within the bounding box may not be perfectly rectangular). Determining whether any part of the object is in the part of the bounding box that was intersected may involve placing different parts of the object in different bounding boxes. For example, the object may be approximated by a collection of adjacent boxes that are smaller than the original box (e.g., that are located within the original box), instead of just by one box. Then a determination may be made whether the line intersect one of the smaller boxes.

In step 412, the image is segmented into regions. The regions may be determined by finding regions of the image having pixels that have the same or a similar color or texture or another common property. Then a determination may be made whether one of those regions overlaps a location on the image where a traffic signal is expected to be. The location in the image where a traffic light is expected to be may be determined based on the map information. If there is an overlap, the traffic signal is determined to be occluded.

In step 414, a determination is made whether the traffic signal is occluded, based on results of step 410 or 412. Optionally, if some of the traffic light is still visible, a value may be associated with the degree to which the light is occluded, and that value may be used as one of the components of the vector. Also, the values of other components of the vector may be decreased to indicate that they are less reliable. For example, the degree of occlusion is assigned a value of K (e.g., 75%), then the other components of the vector may be multiplied by 100%-K (e.g., 100%−75%=25%). In the combined vector, the value of the occlusion component may be the number of lights of the traffic signal that are blocked divided by the total number of lights on the traffic signal.

As an example of a partially occluded traffic signal, if at least one of the lights of the traffic signal is at least partially blocked and at least one of the lights of the traffic signal is not completely blocked, the value of the component representing whether or not the traffic signal is occluded may be fractional number. After step 414, method 400 is exited, and method 300 may proceed to step 306.

Figure 5:
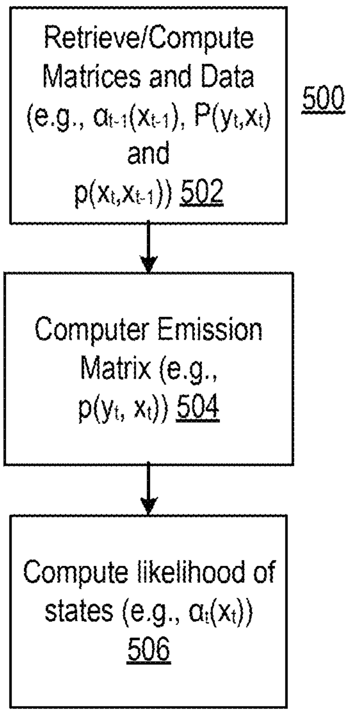
FIG. 5 is a flowchart of an embodiment of a method of implementing one of the steps the method of FIG. 3 to determine the state of the traffic signal.

FIG. 5 is a flowchart of an embodiment of a method 500 of implementing step 310 of FIG. 3 to determine the state of the traffic signal. In step 502, values for computing the state of the light is retrieved or computed. Step 502 may involve computing or retrieving a transition matrix, which determines the probability that a signal having a given state is likely to have a particular state at a later time (e.g., $p(x_t, x_{t-1})$). The later time may be the time of the next sampling or another time. Optionally, the transition matrix may be updated as more information becomes available. Similarly, a matrix ($P(y_t, x_t)$) representing the likelihood that a given measured state is in fact a particular state may be retrieved or computed. Also, the likelihood distribution that a given detected color is a particular color of the light may be computed or returned (e.g., the color measured is one of the colors of the traffic signal, such as the likelihood that an orange light is a red light). Also, information about how long lights in a region of interest stay in a given state may be retrieved. The transition matrix may only need to be retrieved or computed once for a given intersection.

In step 504, the likelihood that a given state corresponds to a given observation is computed (e.g., the observation distribution $p(y_t, x_t)$ is computed from the observation vector elements a, b, c, and d and from the likely-current-state matrix $P(y_t, x_t)$.

In step 506, the likelihood of a given state is computed. For example, the values $\alpha_t(x_t)=p(y_t|x_t)\Sigma p(x_t|x_{t-1})\alpha_{t-1}(x_{t-1})$ over all $x_{t-1}$ (eq.2) may be computed using the transition matrix retrieved in step 502 and the values of $p(y_t\ x_t)$ computed in step 504.

Optionally, the model may be tuned as the model runs for better results or tuned for a specific region. When tuning the model, in various embodiments, in the observation matrix, P(Unknown|Red), P(Unknown|Green) and P(Unknown|Yellow) are all be kept equal. If P(Unknown|Red), P(Unknown|Green) and P(Unknown|Yellow) are not kept equal, when updating a model with an observation in which the state is unknown, the state distribution may drift toward the state set with highest probability of occurring when an unknown state is observed.

In various embodiments, the transition matrix elements for the probability of a transition from red to yellow, from yellow to green, and from green to red, $$p(y_t|R_{t-1}), p(G_t|y_{t-1}) \text{ and } p(R_t|G_{t-1})$$

may all be set to zero, so as to enforce that the order of the state transitions is Red to Green to Yellow to Red. In various embodiments, the transition matrix, $p(x_t, x_{t-1})$ as a whole, should be biased towards yielding Red and Green states. In other words, the transition elements $p(R_t|R_{t-1})$ and $p(G_t|G_{t-1})$ are set to larger values than $p(y_t|y_{t-1})$, so that the likelihood of the transition from red to red and green to green is higher than the transition from yellow to yellow. When updating a model from a completely unknown observation to a state distribution with high likelihood of a Red state, the likelihood of the Red state should decrease the longer the model remains in the red state. When updating a model from a completely unknown observation (for example, Red=0%, Green=0%, Yellow=0%, and unknown=100%) to a state distribution with high likelihood of a Green state, the likelihood of the Green state should slowly decrease the longer the model remains in the Green state. When updating a model from a completely unknown observation to a state distribution with high likelihood of a Yellow state, the likelihood of the Yellow state should also decrease and the Red state should become the state with highest probability after a series of updates with completely unknown observation (that is, updates where the current observation of the current state did not contain information about the current state).

While calculating the likely-current-state matrix values based on the elements with the highest values may be P(Red|R), P(Yellow|Y), and P(Green|G) and the transitions $p(R_t|R_{t-1})$, $p(y_t|y_{t-1})$, and $p(G_t|G_{t-1})$ occur most frequently and have the highest values. So, at times it may be advantageous to counteract this bias, by increasing the value of the observation distribution matrix components of some low chance events. For example, in Tokyo, one may want to set $p(R_t|G_{t-1})$ to about 29% for better performance, which might at first sound counter-intuitive, but it is for the event that green arrow light is occluded and red round light is detected for a traffic signal, which is a frequent occurrence in Tokyo, because of high trucks. Similarly, one may want to set $p(y_t|R_{t-1})$ to 29% in Japan, because of special yellow light logic in Japan.

Figure 6:
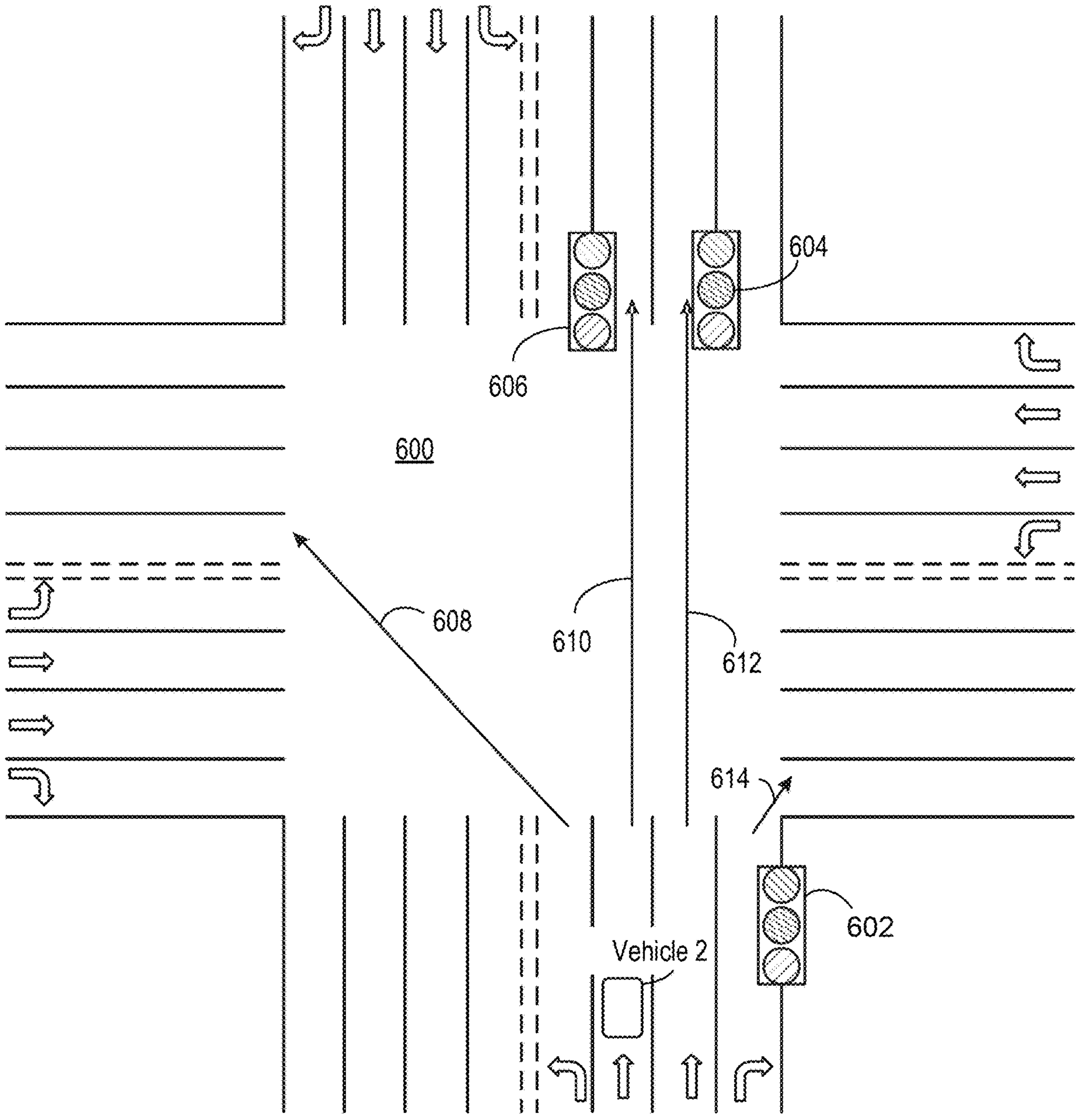
FIG. 6 illustrates an intersection and situations to which the estimation of the state of the traffic signal may be applied.

FIG. 6 illustrates an example intersection 600 and situation to which the estimation of the state of the light may be applied. Vehicle 2 is at intersection 600. Intersection 600 has lights 602, 604, and 606 associated with vehicle 2's direction of travel. Vehicle 2 may need to determine whether to take one of paths 608, 610, 612, or 614. Lights 602, 604, and 606 may have different purposes, depending on the jurisdiction or the signs posted at the intersection. For example, light 602 may be a turn light, whereas lights 604 and 606 may be relevant to their respective lanes. Nonetheless, even if each of lights 602, 604, and 606 provide different information, the states of lights 602, 604, and 606 may be correlated in a predictable way. Alternatively, lights 602, 604, and 606 may contain redundant information, depending on the jurisdiction and the local laws. Path 608 is a left-hand turn, path 610 is for traveling straight, path 612 is for switching lanes, and path 614 is a right-hand turn. It may be that only one of paths or two of the paths 608, 610, 612, and 614 are of interest at any given time that vehicle 2 reaches intersection 600. Alternatively, it may be that there are several ways of getting to the same location and several of paths 608, 610, 612, and 614 may be of interest. It may be that the decision of which to take to arrive at the destination efficiently and safely, may depend on the state of the lights 602, 604, and/or 606. The state of the lights 602, 604, and 606 may need to be analyzed to determine when is it legal and safe for vehicle 2 to take one or more of paths 608, 610, 612, or 614.

Figure 7:
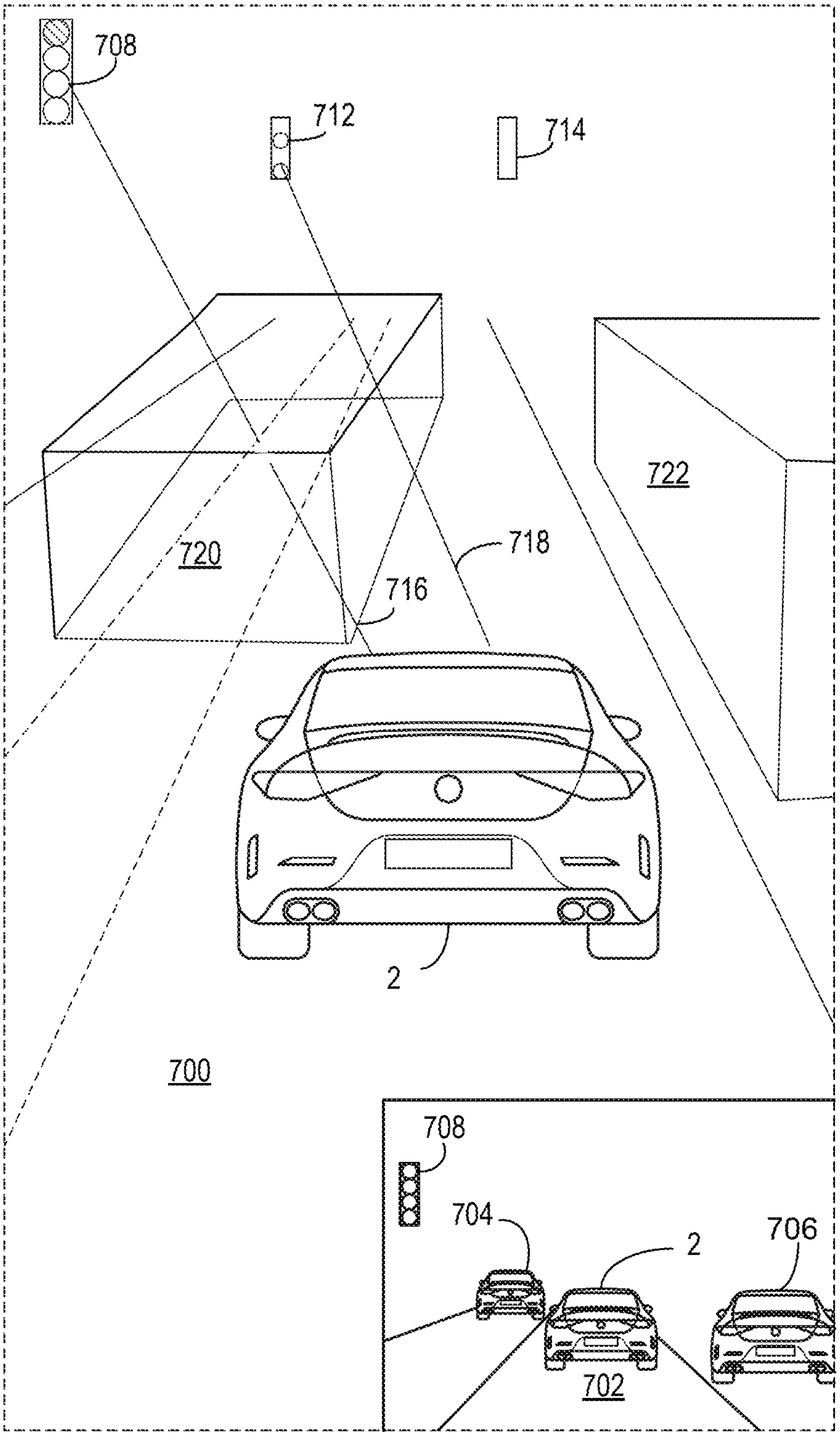
FIG. 7 illustrates an example of an image of a three-dimensional model built to determine whether a traffic signal is occluded.

FIG. 7 illustrates an example of an image 700 of three-dimensional model built to determine whether a traffic signal is occluded. Image 702 is a two-dimensional image of the same scene as image 700. Image 702 includes vehicles 2, 704, and 706, which are in the vicinity of traffic signal 708. In image 700, traffic signals 712 and 714, appear in addition to traffic signal 708. Lines 716 and 718 have been computed between sensors of vehicle 2 and traffic signals 712 and 714. In image 700, vehicles 704 and 706 have been replaced with bounding boxes representing vehicles 704 and 706. In image 702, the state of traffic signal 708 is fully detectable. However, only two of the lights associated with traffic signal 712 are discernable, but the colors of those lights are not discernable. The lights of traffic signal 714 are not discernable, and so no straight path line between the sensors of vehicle 2 and traffic signal 714 was computed. Although the lights of traffic signal 708 are readily discernable, line 716 between the sensors of vehicle 2 the traffic light intersects bounding box 720. Consequently, light 708 may be indicated as occluded and value K may be between 0% and 100% (e.g., 25%) and may be computed to indicate the likelihood that the light 708 is indeed occluded from view. The values associated with the other components of the vector may be multiplied by 100%-K (e.g., 75%). Alternatively or additionally, the representation of vehicle 704 may be refined to better determine if traffic signal 708 is occluded.

Figure 8:
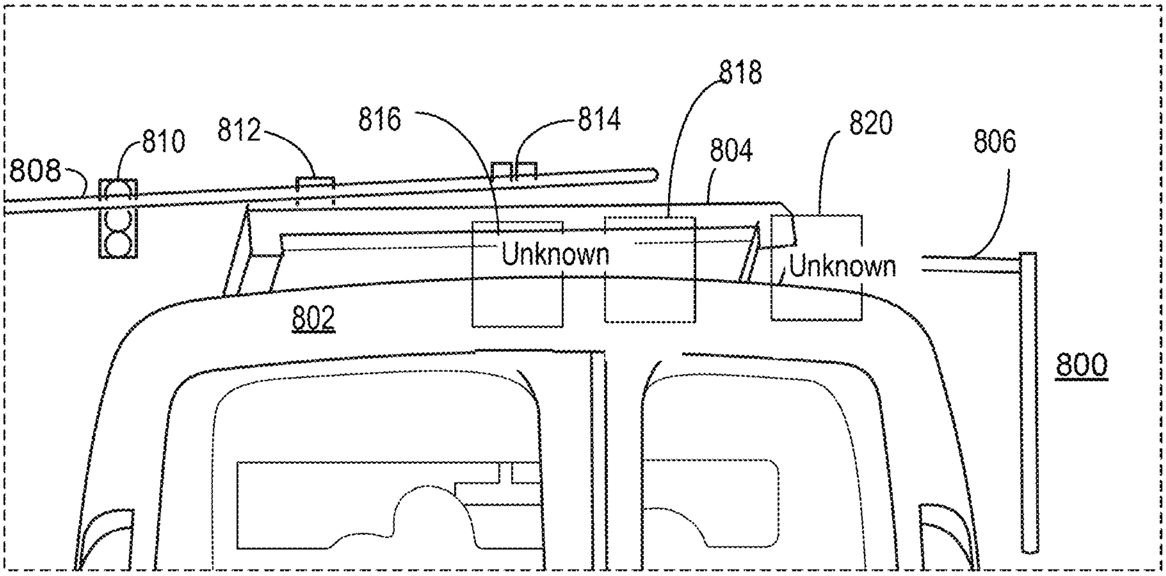
FIG. 8 illustrates an image, which shows an example of an indication of a traffic signal being occluded.

FIG. 8 illustrates an image 800, which shows an example of an indication of a traffic signal being occluded. Image 800 is a crop of a portion of interest of an image where traffic signals are expected to appear. The portion of interest of the image may be isolated or analyzed separately from the rest of the image to reduce the likelihood of inaccurate results. The portion of the image that was cropped may have been determined based on information from a map. Image 800 includes vehicle 802, which has an element 804. Also, illustrated in image 800 are poles 806 and 808 for supporting traffic signals. Pole 806 supports traffic signals 808, 810, and 812, but traffic signals 810 and 812 are occluded, as a result of element 804. Additionally, pole 806 is expected to support traffic signals, which may be determined based on map data or based on an image analysis. In the example of FIG. 8, the traffic signals are expected to be located in boxes 814, 816, and 818. Although image 800 already has indications that the traffic signals are supposed to be located in boxes 814, 816, and 818, an image segmentation analysis may be performed to further confirm that the traffic signals associated with boxes 814, 816, and 818 are completely occluded.

Figure 9:
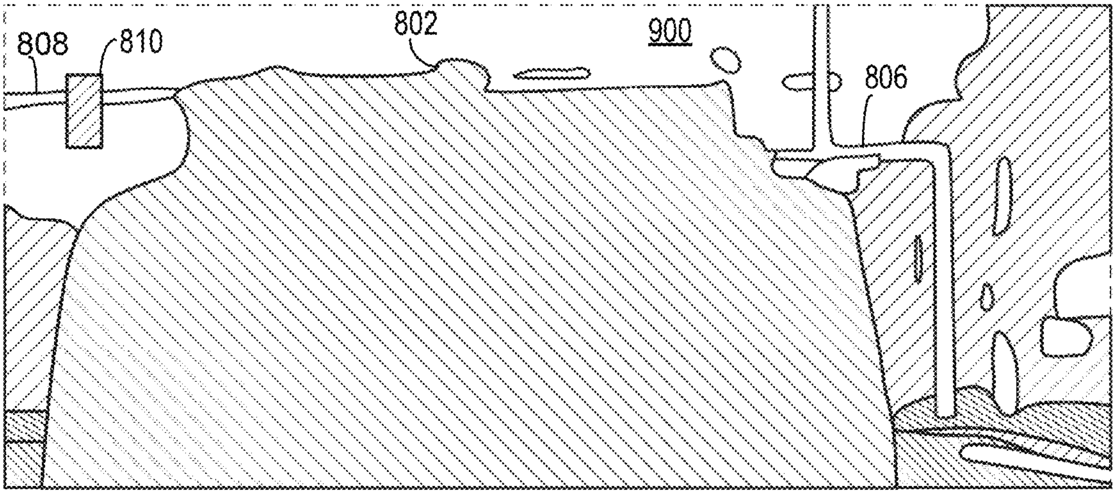
FIG. 9 illustrates a segmented image, which is a version of the image of FIG. 8 after applying an image segmentation analysis.

FIG. 9 illustrates an image 900, which is a version of image 800 after having an example image segmentation analysis applied. Image 900 shows vehicle 802, poles 806 and 810, and traffic signal 808. In image 900, the portion of the image representing vehicle 802 has been filled in with pixels of a relatively uniform color. The segment of image 900 that represents vehicle 802 clearly covers the region of the image 900 where the traffic signals associated with boxes 814, 816, and 818 were located in FIG. 8. This confirms that the traffic signals associated with boxes 814, 816, and 818 are occluded. Accordingly, until vehicle 802 moves, any patches of pixels in the region of boxes 814, 816, and 818 can be ignored, even if those patches of pixels have some resemblance to a traffic signal. By contrast, if in the frame of image 800 or 900, the state of the traffic signals associated with boxes 814, 816, and 818, were just unknown for other reasons (but not occluded), then if some information is received in a later frame that resembles a traffic signal, it is not ignored. It may be desirable to combine that information with the information from the other traffic signals when computing the combined vector that represents all the traffic signals at the intersection.

FIG. 9 shows a second image illustrating an example of the segmentation that results from the image. FIG. 9 illustrates the car at the front, which occludes the traffic signal, so the camera ordinarily would not be able to detect the traffic signal from the image. However, by checking if the cropped area is mostly blue, the system can infer whether a traffic signal is occluded by the blue car.

Figure 10:
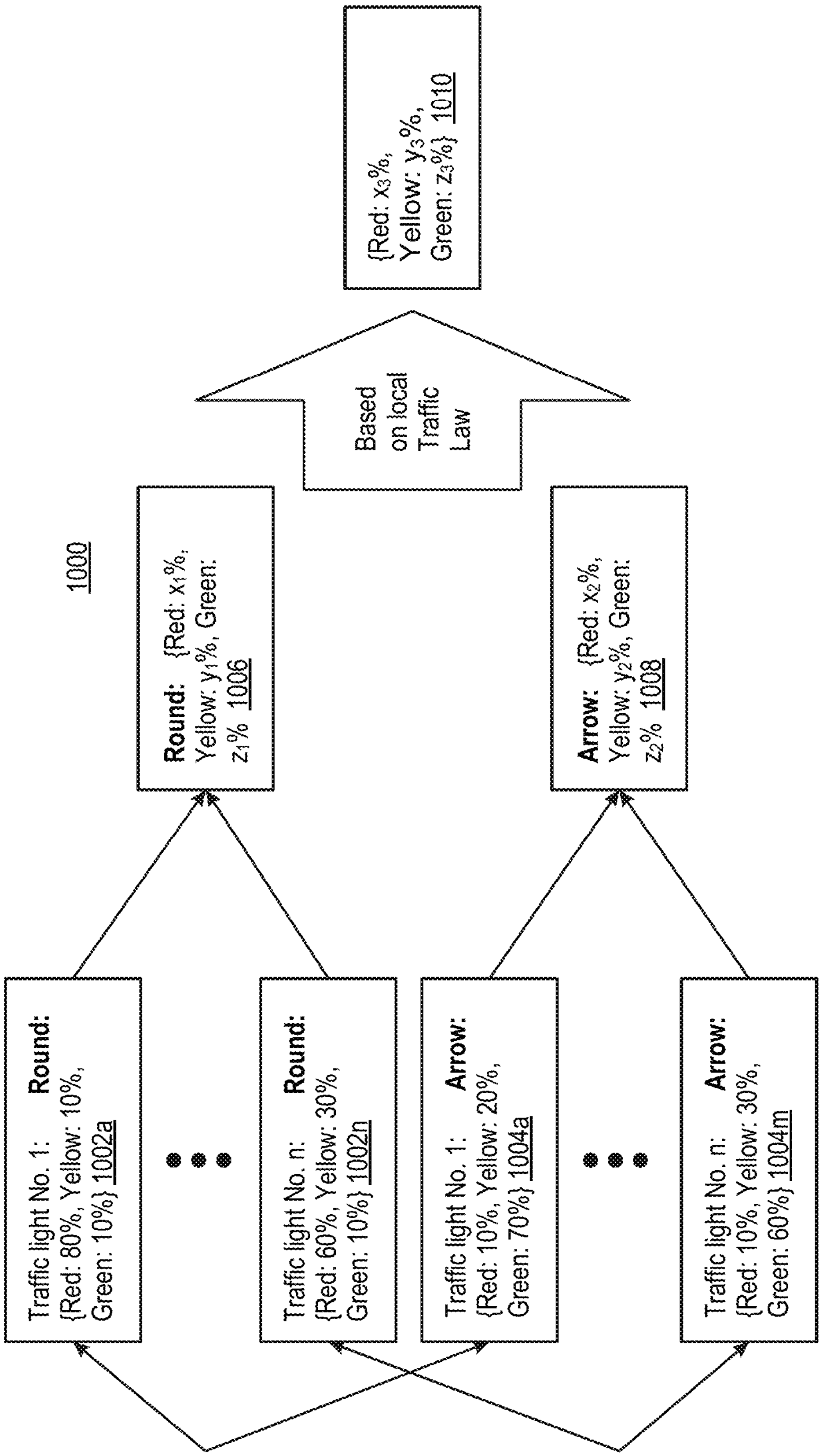
FIG. 10 illustrates an embodiment of a method of forming a vector representing a combination of multiple traffic signals at an intersection.

FIG. 10 illustrates an embodiment of a method 1000 of forming a combined collection of elements representing all the traffic signals at an intersection. The red, yellow, and green values of collection of components 1002*a-n* are combined (e.g., averaged, weight averaged, or otherwise combined) to form the collection of elements 1006, which may include elements $x_1$, $y_1$, and $z_1$. In various embodiments, the collection of elements 1006 has no more elements than the collection of elements 1002*a-n* with the largest number of elements. Similarly, the values of the arrow signals of collection of elements 1004*a-m* are combined to form a collection of elements 1008, which may include elements $x_2$, $y_2$, and $z_2$. In various embodiments, collection of elements 1008 has no more elements than the collection of elements of collection of components 1004*a-m* with the largest number of components. Then, the collection of elements 1006 and collection of elements 1008 may be combined to form one collection of elements 1010, which may include elements $x_3$, $y_3$, and $z_3$. Element $x_3$ may be a combination of elements $x_1$ and $x_2$. Elements $y_3$ may be a combination of elements $y_1$ and $y_2$. Element $z_3$ may be a combination of elements $z_1$ and $z_2$. Alternatively or additionally, collection of elements 1010 may include one element for each component of collection of elements 106 and additionally has one component for collection of elements 1008, which may include components $x_3$, $y_3$, and $z_3$. For example, if collection of elements 1006 had 4 components, and collection of elements 1008 had 3 components, collection of elements 1010 may have 7 components.

Figure 11:
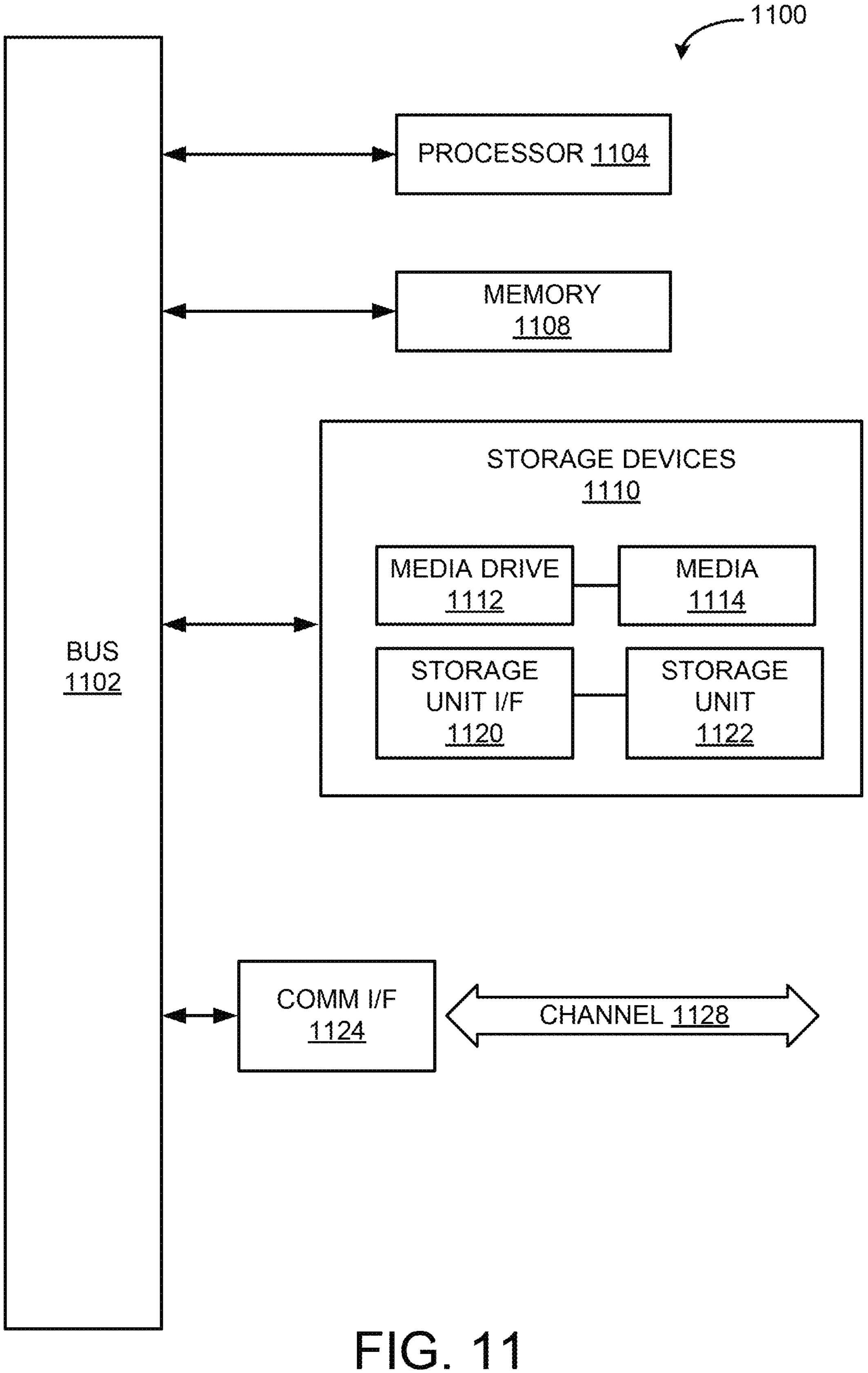
FIG. 11 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 11. Various embodiments are described in terms of this example-computing component 1100. After reading this description, it will become apparent to a person skilled in the relevant art how to implement the application using other computing components or architectures.

Referring now to FIG. 11, computing component 1100 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1100 might also represent computing capabilities embedded within or otherwise available to a given device. For example, a computing component might be found in other electronic devices such as, for example, portable computing devices, and other electronic devices that might include some form of processing capability.

Computing component 1100 might include, for example, one or more processors, controllers, control components, or other processing devices. This can include a processor, and/or any one or more of the components making up user device 102, user system 104, and non-decrypting cloud service 106. Processor 1104 might be implemented using a general-purpose or special-purpose processing engine such as, for example, a microprocessor, controller, or other control logic. Processor 1104 may be connected to a bus 1102. However, any communication medium can be used to facilitate interaction with other components of computing component 1100 or to communicate externally.

Computing component 1100 might also include one or more memory components, simply referred to herein as main memory 1108. For example, random access memory (RAM) or other dynamic memory, might be used for storing information and instructions to be executed by processor 1104. Main memory 1108 might also be used for storing temporary variables or other intermediate information during execution of instructions to be executed by processor 1104. Computing component 1100 might likewise include a read only memory ("ROM") or other static storage device coupled to bus 1102 for storing static information and instructions for processor 1104.

The computing component 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a solid-state drive, a magnetic tape drive, an optical drive, a compact disc (CD) or digital video disc (DVD) drive (R or RW), or other removable or fixed media drive might be provided. Storage media 1114 might include, for example, a hard disk, an integrated circuit assembly, magnetic tape, cartridge, optical disk, a CD or DVD. Storage media 1114 may be any other fixed or removable medium that is read by, written to, or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing component 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot. Other examples may include a PCMCIA slot and card, and other fixed or removable storage units 1122 and interfaces 1120 that allow software and data to be transferred from storage unit 1122 to computing component 1100.

Computing component 1100 might also include a communications interface 1124. Communications interface 1124 might be used to allow software and data to be transferred between computing component 1100 and external devices. Examples of communications interface 1124 might include a modem or soft modem, a network interface (such as Ethernet, network interface card, IEEE 802.XX or another interface). Other examples include a communications port (such as for example, a USB port, IR port, RS232 port Bluetooth® interface, or other port), or another communications interface. Software/data transferred via communications interface 1124 may be carried on signals, which can be electronic, electromagnetic (which includes optical) or other signals capable of being exchanged by a given communications interface 1124. These signals might be provided to communications interface 1124 via a channel 1128. Channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1100 to perform features or functions of the present application as discussed herein.

The various features, aspects and functionality described in one or more of the individual embodiments are not limited in their applicability to the embodiment with which they are described. Instead, they can be applied, alone or in various combinations, to one or more other embodiments, whether such embodiments are described and whether such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining occluded traffic signals, comprising:

generating a virtual model of an area surrounding a traffic signal;

determining whether sensor data of a path from a vehicle to the traffic signal is interrupted by one or more objects based on the virtual model;

determining that the traffic signal is occluded based on a determined interruption;

based on the determination that the traffic signal is occluded, attributing an occlusion indication to the sensor data to determine a probability of a state of the traffic signal and determining a corresponding vehicle response based on the probability; and controlling the vehicle to respond to the traffic signal in accordance with the determined probability of the state of the traffic signal.

2. The method of claim 1, wherein the occlusion indication affects how the sensor data is evaluated when determining the state of the traffic signal.

3. The method of claim 2, further comprising:

determining whether the traffic signal is fully occluded; and based on determining that the traffic signal is fully occluded, ignoring sensor information related to the state of the traffic signal.

4. The method of claim 2, further comprising determining a likelihood that the traffic signal is occluded, wherein the occlusion indication is adjusted based on the likelihood.

5. The method of claim 1, wherein the area comprises a region of a road between the traffic signal and the vehicle.

6. The method of claim 1, wherein determining that the sensor data of the path is interrupted by the one or more objects comprises determining whether the one or more objects interrupt a straight line connecting a sensor to the traffic signal.

7. The method of claim 6, wherein the virtual model comprises a bounding box associated with each of the one or more objects, wherein determining whether the one or more objects interrupt the straight line comprises determining whether the straight line is interrupted by the bounding box.

8. The method of claim 1, wherein determining that the sensor data of the path is interrupted by the one or more objects comprises determining whether a sensor can detect the traffic signal based on received location information.

9. A vehicle, comprising:

a sensor;

one or more processors; and a memory encoded with instructions, which, when executed, cause the one or more processors to:

generate a virtual model of an area surrounding a traffic signal;

determine whether sensor data of a path from the vehicle to the traffic signal is interrupted by one or more objects based on the virtual model;

determine a likelihood that the traffic signal is occluded based on a determined interruption;

based on the likelihood, attribute an occlusion indication to the sensor data to determine a probability of a state of the traffic signal and determine a corresponding vehicle response based on the probability; and control the vehicle to respond to the traffic signal in accordance with the determined probability of the state of the traffic signal.

10. The vehicle of claim 9, wherein the occlusion indication affects how the sensor data is evaluated when determining the state of the traffic signal.

11. The vehicle of claim 9, wherein the instructions further cause the one or more processors to:

determine whether the traffic signal is fully occluded; and if the traffic signal is fully occluded, ignore sensor information related to the state of the traffic signal.

12. The vehicle of claim 9, wherein the area comprises a region of a road between the traffic signal and the vehicle.

13. The vehicle of claim 9, wherein determining that the sensor data of the path is interrupted by the one or more objects comprises determining whether the one or more objects interrupt a straight line connecting the sensor to the traffic signal.

14. The vehicle of claim 13, wherein the virtual model comprises a bounding box associated with each of the one or more objects, wherein determining whether the one or more objects interrupt the straight line comprises determining whether the straight line is interrupted by the bounding box.

15. The vehicle of claim 9, wherein determining that the sensor data of the path is interrupted by the one or more objects comprises determining whether the sensor can detect the traffic signal based on location information.

16. A non-transitory machine-readable storage medium encoded with instructions, which, when executed by one or more processors, causes the one or more processors to:

generate a virtual model of an area surrounding a traffic signal;

determine whether sensor data of a straight line connecting a sensor of a vehicle to the traffic signal is interrupted by one or more objects based on the virtual model;

determine that the traffic signal is occluded based on a determined interruption;

based on the determination that the traffic signal is occluded, attribute an occlusion indication to the sensor data to determine a state of the traffic signal; and control the vehicle to respond to the traffic signal in accordance with the state of the traffic signal.

17. The non-transitory machine-readable storage medium of claim 16, wherein the occlusion indication affects how the sensor data is evaluated when determining the state of the traffic signal.

18. The non-transitory machine-readable storage medium of claim 17, wherein the instructions further cause the one or more processors to:

determine whether the traffic signal is fully occluded; and based on determining that the traffic signal is fully occluded, ignore sensor information related to the state of the traffic signal.

19. The non-transitory machine-readable storage medium of claim 17, wherein the instructions further cause the one or more processors to determine a likelihood that the traffic signal is occluded, wherein the occlusion indication is adjusted based on the likelihood.

20. The non-transitory machine-readable storage medium of claim 16, wherein the virtual model comprises a bounding box associated with each of the one or more objects, wherein determining whether the one or more objects interrupt the straight line comprises determining whether the straight line is interrupted by the bounding box.

* * * * *